(12) United States Patent
Shah et al.

(10) Patent No.: US 12,475,466 B2
(45) Date of Patent: Nov. 18, 2025

(54) SYSTEMS AND METHODS FOR SECURE PROVISIONING OF ACCESS TO TIERED DATABASES

(71) Applicant: PAYACTIV, INC., San Jose, CA (US)

(72) Inventors: Safwan Shah, Saratoga, CA (US); Sohail Aslam, Milpitas, CA (US); Ijaz Anwar, San Jose, CA (US)

(73) Assignee: PAYACTIV, INC., Milpitas, CA (US)

( * ) Notice: Subject to any disclaimer, the term of this patent is extended or adjusted under 35 U.S.C. 154(b) by 301 days.

(21) Appl. No.: 18/376,384

(22) Filed: Oct. 3, 2023

(65) Prior Publication Data

US 2024/0029067 A1 Jan. 25, 2024

Related U.S. Application Data

(63) Continuation of application No. 16/846,368, filed on Apr. 12, 2020, now abandoned, which is a continuation of application No. 16/394,807, filed on Apr. 25, 2019, now Pat. No. 11,636,484, which is a continuation of application No. 15/256,746, filed on Sep. 6, 2016, now Pat. No. 10,318,956, which is a
(Continued)

(51) Int. Cl.
| | |
|---|---|
| *G06Q 20/40* | (2012.01) |
| *G06Q 10/105* | (2023.01) |
| *G06Q 20/32* | (2012.01) |
| *G06Q 20/36* | (2012.01) |
| *G06Q 40/03* | (2023.01) |
| *G06Q 40/12* | (2023.01) |

(52) U.S. Cl.
CPC ........ *G06Q 20/4015* (2020.05); *G06Q 10/105* (2013.01); *G06Q 20/3223* (2013.01); *G06Q 20/3674* (2013.01); *G06Q 40/03* (2023.01); *G06Q 40/125* (2013.12)

(58) Field of Classification Search
CPC ............ G06Q 20/4015; G06Q 10/105; G06Q 20/3223; G06Q 20/3674; G06Q 40/03; G06Q 40/125
See application file for complete search history.

(56) References Cited

U.S. PATENT DOCUMENTS

2021/0090077 A1* 3/2021 Barraza Enciso ...... H04L 9/008

* cited by examiner

*Primary Examiner* — Brian Whipple
(74) *Attorney, Agent, or Firm* — Yantra Patents LLC; Anand P Narayan

(57) ABSTRACT

Implementations are disclosed herein to provide tiered access to databases. In some implementations, a method includes an enrollment processor, generating, at the enrollment processor, an encryption key specific to a computing device associated with the tiered data; providing the encryption key to the computing device; receiving, at the enrollment processor, the tiered data that includes at least first tier data and second tier data, storing the tiered data, receiving, at the enrollment processor, an access request from a second computing device associated with a user, determining, using the in-memory cache, whether there is a match between the data elements and the stored second tier data, based on determination that there is the match, performing a decryption of a portion of the first tier data using the encryption key, and storing the decrypted portion of the first tier data in a third database connected to the enrollment processor.

20 Claims, 14 Drawing Sheets

Related U.S. Application Data continuation-in-part of application No. 14/849,851, filed on Sep. 10, 2015, now abandoned.

(60) Provisional application No. 62/268,501, filed on Dec. 17, 2015, provisional application No. 62/253,150, filed on Nov. 10, 2015, provisional application No. 62/238,622, filed on Oct. 7, 2015, provisional application No. 62/214,179, filed on Sep. 3, 2015, provisional application No. 62/053,658, filed on Sep. 22, 2014.

SYSTEMS AND METHODS FOR SECURE PROVISIONING OF ACCESS TO TIERED DATABASES

CROSS-REFERENCES TO RELATED APPLICATIONS

This application is a continuation of U.S. patent application Ser. No. 16/846,368 filed 12 Apr. 2020, which is a continuation of U.S. patent application Ser. No. 16/394,807 filed 25 Apr. 2019, which is a continuation of U.S. patent application Ser. No. 15/256,746 filed 6 Sep. 2016, now U.S. Pat. No. 10,318,956, which is a continuation in part of, and claims the benefit of U.S. patent application Ser. No. 14/849,851 filed 10 Sep. 2015, which claims the benefit of U.S. Provisional Patent Application No. 62/053,658 filed 22 Sep. 2014. U.S. patent application Ser. No. 15/256,746 also claims the benefit of U.S. Provisional Patent Application No. 62/214,179 filed 3 Sep. 2015, U.S. Provisional Patent Application No. 62/238,922 filed 7 Oct. 2015, U.S. Provisional Patent Application No. 62/253,150 filed 10 Nov. 2015, and U.S. Provisional Patent Application No. 62/268,501 filed 17 Dec. 2015. The specifications of all of the above referenced applications are herein incorporated by reference herein in their entirety.

FIELD OF THE INVENTION

The present disclosure relates generally to systems and methods for providing secure access to tiered data, data processing, and authentication of data from multiple sources, and/or conducting financial transactions.

BACKGROUND

Tiered data is commonly encountered in data processing applications. Data that is associated with a single entity, e.g., a user, employee, etc., may be associated with different permissions and security considerations. One of the challenges for such a service is the enrollment and onboarding of the users, since all the key data must be exchanged. In addition, authentication of the users is also required to prevent identity theft and other misuse of the system.

For scalability of the service, there is a need for a secure system of gathering data from one or more sources, that allows authentication and verification of the identity of the user, and which is convenient to use. There is a need, therefore, for scaleable systems and methods that can solve the aforementioned technical problem.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to provide access to tiered data. The computer-implemented method also includes providing an enrollment processor, where the enrollment processor is connected to a network via a firewall, and where the enrollment processor is communicatively coupled to a bastion host and a load balancer; generating, at the enrollment processor, an encryption key specific to a computing device associated with the tiered data; providing the encryption key to the computing device; receiving, at the enrollment processor, the tiered data that includes at least first tier data and second tier data, where the first tier data may include encrypted data that has been encrypted using the provided encryption key and the second tier data may include unencrypted data; storing the tiered data, where the first tier data is stored at a first database connected to the enrollment processor, and the second tier data is stored in an in-memory cache connected to the enrollment processor; receiving, at the enrollment processor, an access request from a second computing device associated with a user, where the access request includes data elements from the second tier data, and where the data elements are associated with the user; determining, using the in-memory cache, whether there is a match between the data elements and the stored second tier data; based on determination that there is the match, performing a decryption of a portion of the first tier data using the encryption key; and storing the decrypted portion of the first tier data in a third database connected to the enrollment processor. Other embodiments of this aspect include corresponding computer systems, apparatus, and computer programs recorded on one or more computer storage devices, each configured to perform the actions of the methods.

Implementations may include one or more of the following features. The computer-implemented method may include based on a determination that there is no match between the data elements and the stored second tier data, retrieving additional data elements from the first database. Receiving the tiered data may include receiving the tiered data via one of: a web interface and a file exchange. Receiving the tiered data may include receiving the tiered data as a batch-wise addition to the first database. Determining whether there is a match between the data elements and the stored second tier data may include performing a cache hit of the in-memory cache. Determining whether there is the match may include determining whether a threshold number of data elements in the access request match data elements in the first tier data and the second tier data. Receiving the access request from a second computing device associated with a user may include receiving the access request via a short messaging service (sms) message and where the method further may include parsing the request to determine a language of the access request. Implementations of the described techniques may include hardware, a method or process, or computer software on a computer-accessible medium.

One general aspect includes a system. The system also includes a user device configured to transmit an access request; and an enrollment processor, coupled to a data cache memory and to a first database, an in-memory cache, and a third database, where the enrollment processor is connected to a network via a firewall, and where the enrollment processor is communicatively coupled to a bastion host and a load balancer, and where the enrollment processor is configured to: generating an encryption key specific to a computing device associated with tiered data; providing the encryption key to the computing device; receiving the tiered data that includes at least first tier data and second tier data, where the first tier data may include encrypted data that has been encrypted using the provided encryption key and the second tier data may include unencrypted data; storing the tiered data, where the first tier data is stored at a first database connected to the enrollment processor, and the second tier data is stored in an in-memory cache connected to the enrollment processor; receiving an access request from a second computing device associated with a user, where the access request includes data elements from the second tier data, and where the data elements are associated with the user; determining, using the in-memory cache, whether there is a match between the data elements and the stored second tier data; based on determination that there is the match, performing a decryption of a portion of the first tier data using the encryption key; and storing the decrypted portion of the first tier data in a third database connected to the enrollment processor. Other embodiments of this aspect include corresponding computer systems, apparatus, and computer programs recorded on one or more computer storage devices, each configured to perform the actions of the methods.

Implementations may include one or more of the following features. The system where the enrolment processor is further configured to retrieving additional data elements from the first database. Receiving the tiered data may include receiving the tiered data via one of: a web interface and a file exchange. Receiving the tiered data may include receiving the tiered data as a batch-wise addition to the first database. Determining whether there is a match between the data elements and the stored second tier data may include performing a cache hit of the in-memory cache. The enrolment processor is further configured to preloading the first tier data and the second tier data into a grid, and where determining whether there is the match may include determining whether a threshold number of data elements in the access request match data elements in the first tier data and the second tier data. Receiving the access request from a second computing device associated with a user may include receiving the access request via a short messaging service (SMS) message and where the enrolment processor is further configured to parsing the request to determine a language of the access request. Implementations of the described techniques may include hardware, a method or process, or computer software on a computer-accessible medium.

One general aspect includes a non-transitory computer-readable medium may include instructions that. The non-transitory computer-readable medium also includes providing an enrollment processor, where the enrollment processor is connected to a network via a firewall, and where the enrollment processor is communicatively coupled to a bastion host and a load balancer; generating, at the enrollment processor, an encryption key specific to a computing device associated with tiered data; providing the encryption key to the computing device; receiving, at the enrollment processor, the tiered data that includes at least first tier data and second tier data, where the first tier data may include encrypted data that has been encrypted using the provided encryption key and the second tier data may include unencrypted data; storing the tiered data, where the first tier data is stored at a first database connected to the enrollment processor, and the second tier data is stored in an in-memory cache connected to the enrollment processor; receiving, at the enrollment processor, an access request from a second computing device associated with a user, where the access request includes data elements from the second tier data, and where the data elements are associated with the user; determining, using the in-memory cache, whether there is a match between the data elements and the stored second tier data; based on determination that there is the match, performing a decryption of a portion of the first tier data using the encryption key; and storing the decrypted portion of the first tier data in a third database connected to the enrollment processor. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the operations further may include based on a determination that there is no match between the data elements and the stored second tier data, retrieving additional data elements from the first database. Receiving the tiered data may include receiving the tiered data via one of: a web interface and a file exchange. Receiving the tiered data may include receiving the tiered data as a batch-wise addition to the first database. Determining whether there is a match between the data elements and the stored second tier data may include performing a cache hit of the in-memory cache. Receiving the access request from a second computing device associated with a user may include receiving the access request via a short messaging service (SMS) message and where the operations further may include parsing the request to determine a language of the access request. Implementations of the described techniques may include hardware, a method or process, or computer software on a computer-accessible medium.

According to a set of illustrative embodiments, a system for providing access to earned but unpaid income to a user may include a bastion server to access one or more external servers that restricts intruders, an authentication processor for receiving a request for access from a remote device, a load balancer server coupled to a plurality of façade servers that generates an interface tailored to the remote device, a database server configured to store a multiple elements of encrypted user data, a rules engine server coupled to the database server and configured to store multiple rules governing access to earned but unpaid income, and a transaction processing server that is coupled to the database server and the rules engine server and configured to receive a request comprising a selection of a financial service, an amount of requested funds and a deduction schedule, and to determine whether the selection complies with the rules governing access to earned but unpaid income.

DETAILED DESCRIPTION

Figure 1:
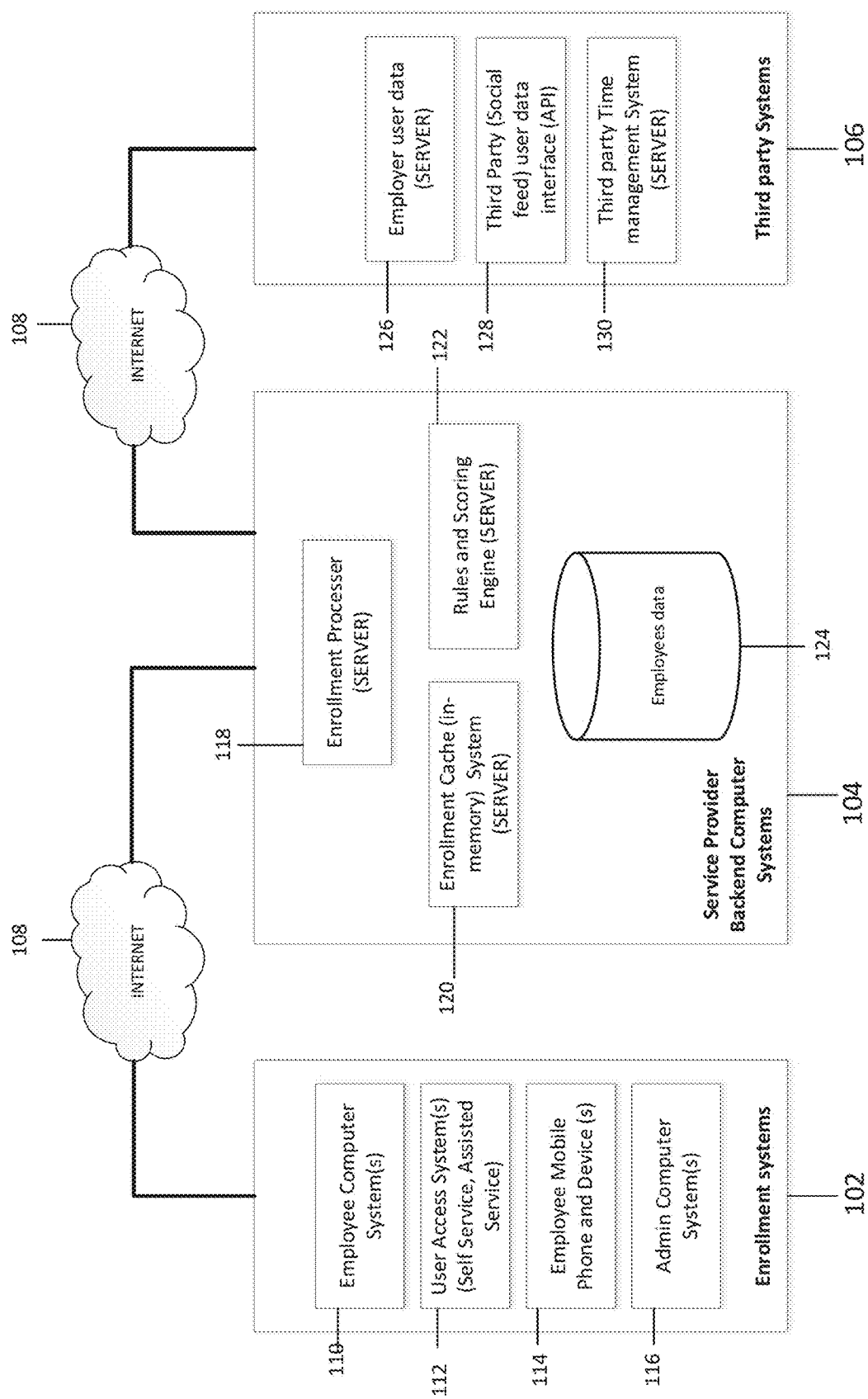
FIG. 1 is a block diagram illustrating the main components of a computer system built in accordance with the present disclosure.

The present disclosure relates to methods and systems for authentication, enrollment, or onboarding of users into systems for financial transactions. More specifically, it relates to methods and systems for enrolling users into real-time payroll systems wherein users may obtain access to their earned but unpaid earnings.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

The present disclosure relates to methods and systems for performing financial transactions and in at least some embodiments relates to such methods and systems that involve the establishment and operation of a financial services network, by way of an intermediary or "third party" that interacts with employers and their employees, with regard to the earned but unpaid (EBU) wages/income of the employees. In some embodiments, users are able to obtain a form of decoupled debit that is linked to their own accrued wages/income, and offers a way to increase the velocity of money in the system. The earned but unpaid wages/income arise because employers process payroll weekly, bi-weekly, bi-monthly, or monthly for income that is already earned by an employee prior to payday. That is, most employers typically withhold wages/income for a certain period of time even after dispersing wages/income for earned income. For example, an employer that processes payroll on a bi-weekly basis and pays wages/income for two weeks worked at the end of third week. In this example, depending on the day under consideration, an employee can have earned but unpaid income between 1 to 21 days.

In at least some such embodiments, member users are able to instantly access financial services such as check cashing, bill pay, remittance, savings, prepaid long distance minutes, prepaid cellular top-up, open and closed loop prepaid cards, payroll cards, secured and unsecured credit cards, budgeting tools, credit counseling, auto financing, and other relevant products, services, offers and discounts. Further, in at least some embodiments, the network is designed to offer its members (particularly employee members) products and services based on the employee's employment status and income. Additionally, in least some embodiments, employment is generally a pre-requisite to access the membership program, and the membership program is offered by the third party to employees by way of their employers (that is, it is by virtue of the employer's participation in the network that the network becomes accessible and usable by the employer's employees). Also, in at least some such embodiments, the third party acts as a benefit administrator and a payment and payroll processor between the employer and the employee.

Referring to FIG. 1, the schematic diagram shows components of different computer systems communicating with one another. An enrollment system 102 is shown communicating via a network 108 with a Backend computer system of a service provider 104. The enrollment system 102 comprises devices, computers and equipment that may be used by users to enroll into systems for financial transactions. Examples include Employee Computer system(s) 110, User Access systems such as kiosks 112, Employee Mobile phone or other portable device 114, and Administrative (Admin) Computer systems 116. The Backend Computer System 104 is configured to include an Enrollment Processor 118, Employee database store 124, an enrollment cache 120 configured as an in-memory system, and a Rules and Scoring Engine 122. The Backend Computer system 104 is also shown communicating over a network 108 with Third Party systems 106, which may include subsystems such as Employer user data 126, Third party user data 128, and Third party time management system 130. The third party user data subsystem 128 can include modules that can link using application program interfaces (API) with social media feed data, and other data sources. The term employee is used to broadly include a full-time employee, a part time employee, a contract employee, and other relationships that are similar in nature.

One of the blocks to be performed is the gathering of employee data 124, which could also be termed as pre-enrollment. This data can be advantageously obtained from an employer with whom a relationship is established by the service provider. The employer provides data, which is typically encrypted, about its employees who are expected to join the program. The data includes fields chosen from a set that includes such fields as first name, last name, and employee identification number (employee id), date of birth, email address, mobile number, and address. This data is uploaded either through a web interface, or through a file exchange. In certain cases, employers may only provide data about employees who are approved to join the program. The data may also differentiated into tiers based on the source and/or ownership of the data. Tier-1 (Service provider level), Tier-2 (employer level) and tier-3 (employee level) are possible tiers that may be used. The system may also be configured such that data from the employer is only shared when an enrollment request is initiated by a user.

Figure 2:
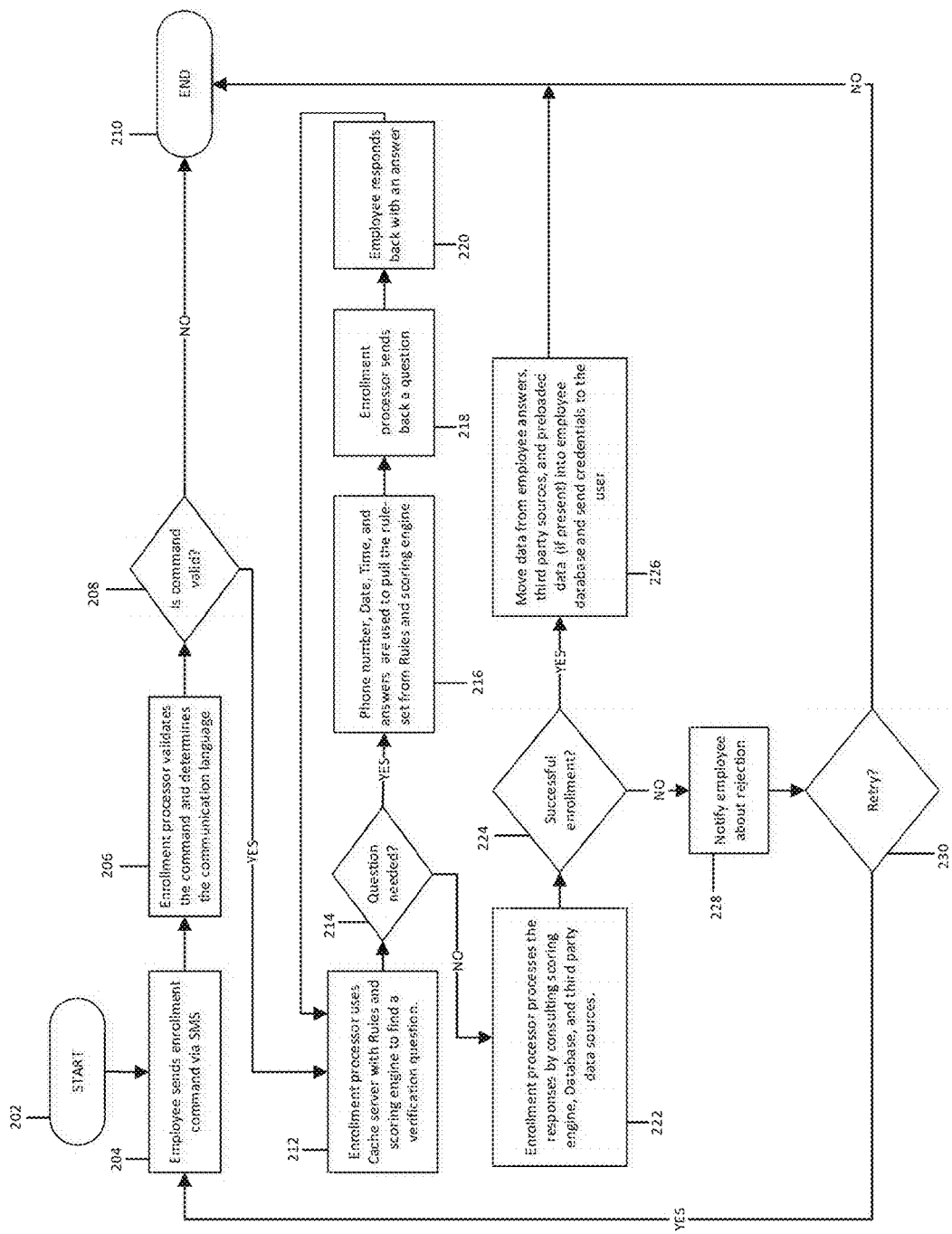
FIG. 2 is a flow diagram that illustrates a text message or SMS based enrollment workflow in accordance with the present disclosure.

FIG. 2 is a flowchart showing the workflow in a preferred embodiment of the enrollment process. In this embodiment, a mobile phone based or subscriber message service (SMS) based method is envisaged for enrollment, wherein based on a received text message/SMS, the backend checks against the pre-enrolled data and, and if a sufficient number of fields from first name, last name, date of birth or employee id match, the employee is enrolled, and a welcome message is sent. Different destination phone numbers may be provided to employees from different employers in order for the system to uniquely identify the employer when the SMS is received.

More specifically, the process starts at 202, with an employee or user sending a request via a text message or SMS 204. A preferred method is to use a string that is configurable such as "enroll me". An enrollment processor receives the message and the contents of the message are parsed to ascertain the language of the command received and its validity at step 206. Multiple strings may be used to initiate the same workflow—this may be needed in order to support multiple languages, and to allow for minor typographical errors and variants in spelling. If the command is determined to be invalid at step 208, the process terminates at 210. This could be a situation where the phone number that receives the text message is not expecting an enrollment message. In this scenario, the message is ignored but may be logged for review. Alternately, the phone number that receives the text message (which is communicatively coupled to the enrollment server) is expecting enrollment SMSs but gets an empty text message. In this scenario, this entry is logged in the database, and a screen view in a "Customer Service" tab shows the request with a check-box column (not checked)—the reason it is not-checked is to ensure that a call is placed for proceeding with enrollment. The view may have fields such as Serial Number, Employer Name for whom enrollment request was submitted, Timestamp when the request was received, the receiving phone number (the one that the SMS was addressed to), Sender's phone number, a checkbox as to if the request was processed or not, and the contents of the text message.

If the command is valid at step 208, the enrollment processor uses its Cache along with a Rules engine and a scoring engine at step 212 to check if a verification question is required or whether enrollment can proceed without any additional verification.

If it is determined that a further question is required at step 214, the workflow proceeds to step 216 where the already received data such as Phone number, Date, Time, and answers are used to pull a rule-set from the Rules and scoring engines, based on which the Enrollment processor sends a query or question back to the employee at step 218. The language for communicating with the user is based on smart logic; for example, if the communication starts with a Spanish command the questions are all asked in Spanish. If the enrollment processor sees it is inside enrollment window it responds back with a question such as "please enter your employee ID". Based on the response, and on determining that it is an employee ID that is being received, the systems checks the database and if there is an employee id that is not enrolled yet and the sender's phone number is also not enrolled then the rules engine determines if a new question needs to be asked. If a new question is to be asked, then a new question such as "enter your date of birth in MMDDYYYY format e.g., Jan. 1, 1980, should be sent as 01011980" is asked.

Once the employee responds back with their answer(s) at step 220, the workflow reverts to step 212, where the Enrollment processor 206 processes the newly received data in conjunction with the data already received and to step 214, where the determination about additional data is made. If it is determined at step 214 that no further verification is required, then the Enrollment processor next processes the responses using the scoring engine, Database, and third party data sources at step 222.

After this processing, a determination around successful enrollment is made at step 224; if the enrollment is deemed successful, the workflow proceeds to step 226 where the data from employee answers, third party sources, and preloaded data (if present) are moved into employee database and credentials along a message of successful enrollment is sent to the user at step 226, after which the process terminates at step 210 upon successful enrollment. If at step 224, the enrollment is deemed unsuccessful, the user or employee is notified about the rejection at step 228, and given an option to retry at step 230. The reason for rejection is captured for subsequent enquiry and debugging.

If the process is to be retried based on user feedback and settings, the workflow reverts to step 204 for repeat of the workflow. If no retry is offered or chosen, the workflow terminates at step 210.

An example realization of the workflow of FIG. 2 is now described in greater detail. The following configurations are first established. A phone number capable of receiving text messages (SMS) is identified in the backend computer system 104, and more particularly, within server 118. Certain system level variables are defined, which may be configurable from implementation to implementation. A time range is defined and "From" and "To" timestamps are identified in order to indicate an active time range. In addition, one or more employer IDs are identified whose enrollment needs to take place. A list is established of phone numbers and email addresses which get notifications when a request is received.

The number of allowed attempts to enroll is defined (If a phone number exceeds the specified attempts, then no further requests are entertained). A default number of attempts may be set, for example, to 3 or 5.

Criteria are also established for the rules and scoring engine 122, which specify the rules based on which matching and verification of data needs to take place for enrollment. Some suggested options may include Employee ID, First Name+Last Name+Date of Birth (DOB) (e.g. John+Smith+12301990), Date of Birth (DOB) (in MMDDYYYY format). A case insensitive comparison may be used, with trimmed spaces around the '+' sign, though other similar data may be used. The database 124 and cache 120 is loaded with all employees' data of the employer of interest.

In some cases, employers may wish to individually approve the employees. For such cases, a preferred embodiment is proposed where, once the data is verified as described earlier, a communication, which could be in the form of an email or a file exchange, or some other manner of data exchange is sent to the employer or employer database, and once that approval comes, the employee is considered enrolled, and a message sent to the employee regarding successful enrollment.

Figure 3:
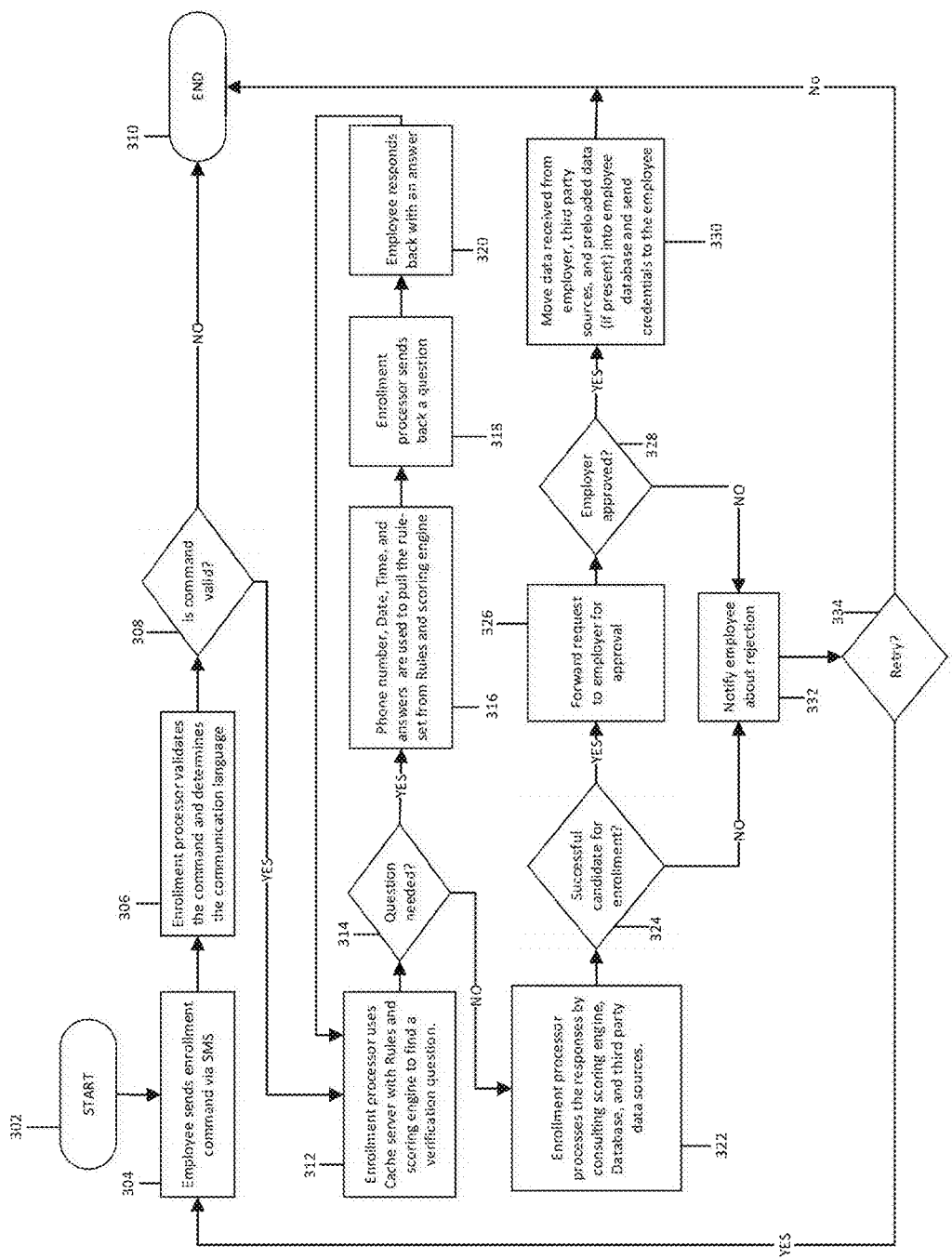
FIG. 3 is a flow diagram that illustrates a text message or SMS based enrollment workflow requiring employer post-approval in accordance with the present disclosure.

FIG. 3 is a flowchart that illustrates the enrollment process using SMS (text message) where an employer approval is required.

In this embodiment, a mobile phone based or subscriber message service (SMS) based method is envisaged for enrollment, wherein based on a received text message/SMS, the backend checks against pre-enrolled data and, and if a sufficient number of fields from first name, last name, date of birth or employee id match, the employee is enrolled, and a welcome message is sent. Different destination phone numbers may be provided to employees from different employers in order for the system to uniquely identify the employer when the SMS is received.

More specifically, the process starts at 302, with an employee or user sending a request via a text message or SMS 304. A preferred method is to use a string that is configurable such as "enroll me".

An enrollment processor 306 receives the message and the contents of the message are parsed to ascertain the language of the command received and its validity. Multiple strings may be used to initiate the same workflow—this may be needed in order to support multiple languages, and to allow for minor typographical errors and variants in spelling.

If the command is determined to be invalid at step 308, the process terminates at step 310. This could be a situation where the phone number that receives the text message is not expecting an enrollment message. In this scenario, the message is ignored but may be logged for review. Alternately, the phone number that receives the text message (which is communicatively coupled to the enrollment server) is expecting enrollment SMSs but gets an empty text message. In this scenario, this entry is logged in the database, and a screen view in a "Customer Service" tab shows the request with a check-box column (not checked)—the reason it is not-checked is to ensure that a call is placed for proceeding with enrollment. The view may have fields such as Serial Number, Employer Name for whom enrollment request was submitted, Timestamp when the request was received, the receiving phone number (the one that the SMS was addressed to), Sender's phone number, a checkbox as to if the request was processed or not, and the contents of the text message.

If the command is valid at step 308, the enrollment processor uses its Cache along with a Rules engine and a scoring engine at step 312 to check if a verification question is required or whether enrollment can proceed without any additional verification.

If it is determined that a further question or data is required at step 314, the workflow proceeds to step 316 where the already received data such as Phone number, Date, Time, and answers are used to pull the rule-set from the Rules and scoring engines, based on which the Enrollment processor sends a query or question back to the employee at step 318.

The language for communicating with the user is based on smart logic; for example, if the communication starts with a Spanish command the questions are all asked in Spanish. If the enrollment processor sees it is inside enrollment window it responds back with a question such as "please enter your employee ID". Based on the response, and on determining that it is an employee ID that is being received, the system checks the database and if there is an employee id that is not enrolled yet and the sender's phone number is also not enrolled then the rules engine determines if a new question needs to be asked. If a new question is to be asked, then a new question such as "enter your date of birth in MMDDYYYY format e.g. Jan. 1, 1980 should be sent as 01011980" is asked.

Once the employee responds back with their answer(s) at step 320, the workflow reverts to step 312, where the Enrollment processor 306 processes the newly received data in conjunction with the data already received and to step 314, where the determination about additional data is made.

If it is determined at step 314 that no further verification is required, then the Enrollment processor next processes the responses using the scoring engine, Database, and third party data sources at step 322. After this processing, a determination around successful enrollment is made at step 324; if the enrollment is deemed successful, the workflow proceeds to step 326, where the enrollment request is forwarded to the employer.

If the employer approves at step 328, then the data from employee answers, third party sources, and preloaded data (if present) are moved into employee database and credentials along a message of successful enrollment is sent to the user at step 330, after which the process terminates at step 310 upon successful enrollment. If the employer disapproves the request at step 328, the employee is notified about the rejection at step 332, and given an option to retry at step 334.

In some implementations, a determination around successful enrollment is made; if the enrollment is deemed successful, the workflow proceeds directly (without employee approval) to step 328 where the data from employee answers, third party data sources, and preloaded data (if present) are moved into employee database and credentials along a message of successful enrollment is sent to the user, after which the process terminates upon successful enrollment. If the enrollment is deemed unsuccessful, the user or employee is notified about the rejection, and given an option to retry.

If at step 324, the enrollment is deemed unsuccessful, the user or employee is notified about the rejection at step 332, and given an option to retry at step 334. The reason for rejection is captured for subsequent enquiry and debugging.

If the process is to be retried based on the user feedback and process settings, the workflow reverts to step 304 for repeat of the workflow. If no retry is offered or chosen, the workflow terminates at step 310.

Employee pre-enrollment is achieved by way of a client-server model of interaction in which the employer computer system accesses a website or portal provided by the third party computer system 1100 (FIG. 11), downloads web pages from that website, and receives from and provides to that website various information. The employer gets a secured account and access to the third party's online portal. Assuming that such account setup has been performed, at a next step, the employer computer system as operated by an administrator employed by or otherwise associated with the employer associated with that employer computer system successfully logs in to the portal so as to establish the portal session.

Once the third party computer system 1100 determines whether the employer computer system that has logged in has privileges to pre-enroll employees on behalf of the employer associated with employer computer system, employee information is uploaded from the employer computer system to the third party computer system. In at least some embodiments or circumstances, the website of the third party computer system 1100 provides web pages that allow for one or both of a "bulk upload" interface or a "new employee" interface to be utilized for the uploading of employee information.

In the present embodiment the third party computer system 1100 of the third party utilizes a data encryption process to enroll employees into the program, and this mechanism generally disallows personal identifiable employee data to be viewed or retained by the third party without employee consent. The third party computer system preferably generates an encryption code or key ("EMPL-KEY") that is specific for the employer associated with the employer computer system, and provides that key to the employer computer system 130 for receipt and use by the employer administrator. Further, once the encryption key has been assigned and sent to the employer computer system, then that employer specific encryption key is used to encrypt and store the employee personal data that was uploaded.

Exemplary employee data elements include:
(a) First Name
(b) Last Name
(c) Employee ID
(d) DOB (date of birth)

(e) Residence Zip Code
(f) Email address (optional)
(g) Mobile #(optional)
(h) Last 4 digits of SS #
(i) Hourly Pay rate During the upload process, at least the employee data (d) through (i) is encrypted, using the unique encryption key assigned to each employer. Further, in a preferred embodiment the employee data (a) through (c) and only encrypted data (d) through (i) is received and retained by the third party computer system 1100.

It should be appreciated that the process of employee pre-enrollment, in at least some embodiments, is limited to employers that have been approved by the third parties associated with third party computer system(s) 110 and accordingly have privileges to pre-enroll. In granting such privileges to various employers, the third parties can take into account any of a variety of factors, and the accounting for such factors can, in at least some embodiments, be partly or entirely automated. For example, in at least some embodiments, the third parties and/or the third party computer system(s) can take into account one or more of the following factors (which can be generally considered as regulatory, risk, and/or quantitative factors) to determine the eligibility of various employers to interact with the system, allow for the employees of the employers to access or use the services made possible by way of the EBU system (that is, allow the employers to make available access to the EBU program to its employees).

An example realization of the workflow is now described in greater detail. The following configurations are first established. A phone number capable of receiving text messages (SMS) is identified in a backend computer system, and more particularly, within a server. Certain system level variables are defined, which may be configurable from implementation to implementation. A time range is defined and "From" and "To" timestamps are identified in order to indicate an active time range. In addition, one or more employer IDs are identified whose enrollment needs to take place. A list is established of phone numbers and email addresses which get notifications when a request is received.

The number of allowed attempts to enroll is defined (If a phone number exceeds the specified attempts, then no further requests are entertained). A default number of attempts may be set, for example, to 3 or 5.

Criteria are also established for the rules and scoring engine 122, which specify the rules based on which matching and verification of data needs to take place for enrollment. Some suggested options may include Employee ID, First Name+Last Name+Date of Birth (DOB) (e.g. John+Smith+12301990), Date of Birth (DOB) (in MMDDYYYY format). A case insensitive comparison may be used, with trimmed spaces around the '+' sign, though other similar data may be used. A database and cache are also loaded with all employees' data of the employer of interest.

In some cases, employers may wish to individually approve the employees. For such cases, a preferred embodiment is proposed where, once the data is verified as described earlier, a communication, which could be in the form of an email or a file exchange, or some other manner of data exchange is sent to the employer or employer database, and once that approval comes, the employee is considered enrolled, and a message sent to the employee regarding successful enrollment.

Kiosk based enrollment is also enabled in another embodiment. In this embodiment, an enrollment enabled kiosk is used wherein an employee seeking to enroll uses the kiosk to provide basic details from a set of details such as first name, last name, employee id, a mobile phone number, and selects a button that signifies 'Enroll me'. A PIN is sent to the mobile number via a text message which is valid for a specified period, say, 15 minutes or any other suitably defined period, and when the mobile PIN is entered, the approval process is completed. Alternatively, a phone call is made for verification. This embodiment can also be used where no data is uploaded ahead of the enrollment process.

Figure 4:
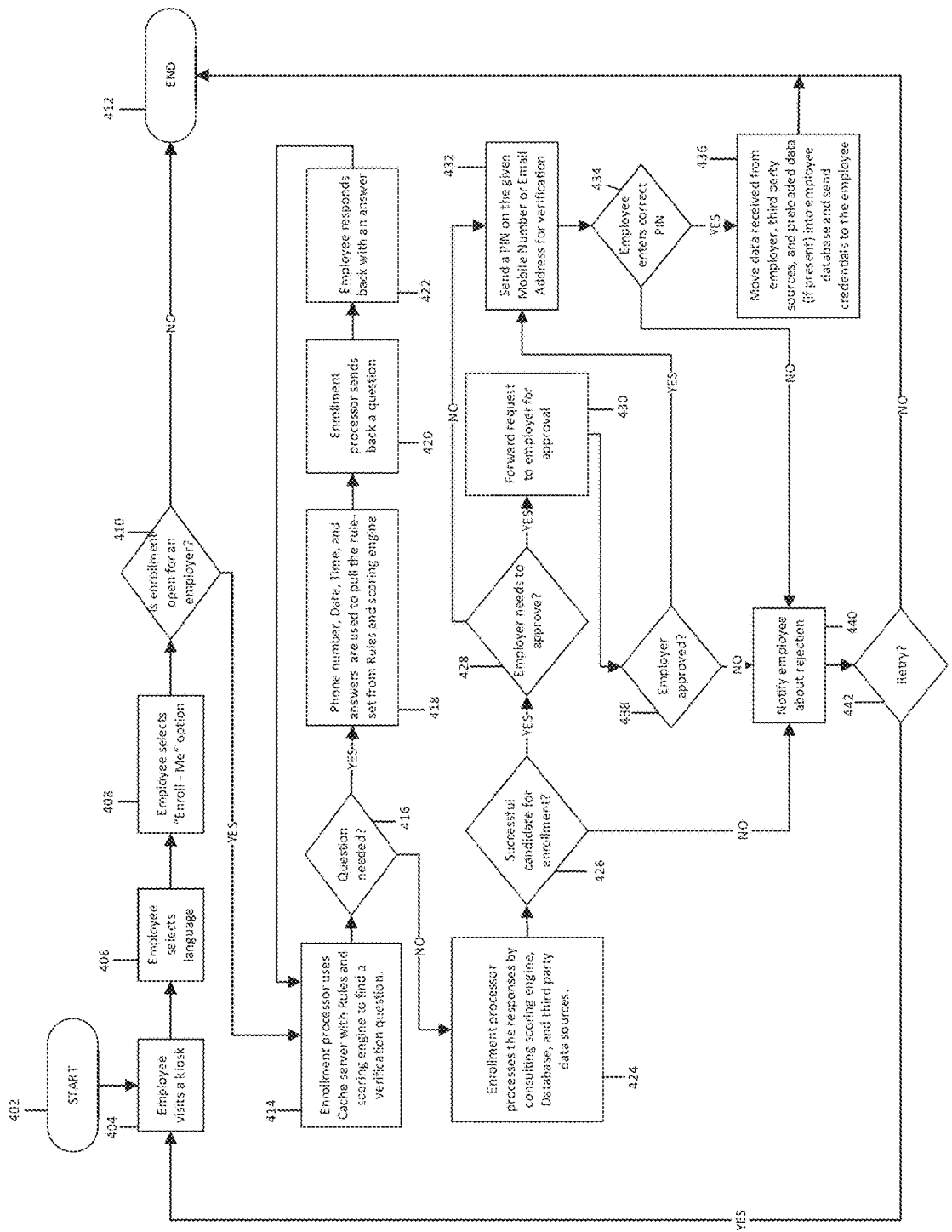
FIG. 4 is a flow diagram that illustrates the workflow of a kiosk based enrollment in accordance with the present disclosure.

FIG. 4 is a flowchart that illustrates kiosk based enrollment. A user or employee approaches either a self-service or assisted service kiosk 404, proceeds to select a language at 406, and then selects a button or icon signifying enrollment such as an 'Enroll me' option at 408. The enrollment processor checks to see if enrollment is open for the given employer and/or at the current kiosk at step 410. If enrollment is not open, the process terminates at step 412.

If enrollment is open, the enrollment processor uses its Cache along with a Rules engine and a scoring engine at step 414 to check if a verification question is required or whether enrollment can proceed without any additional verification. If it is determined that a further question or data is required at step 416, the workflow proceeds to step 418 where the already received data such as Phone number, Date, Time, and answers are used to pull the rule-set from the Rules and scoring engines, based on which the Enrollment processor sends a query or question back to the employee at step 420. Once the employee responds back with their answer(s) at step 422, the workflow reverts to step 414, where the Enrollment processor processes the newly received data in conjunction with the data already received and to step 416, where the determination about additional data is made.

If it is determined at step 416 that no further verification is required, then the Enrollment processor next processes the responses using the scoring engine, Database, and third party data sources at step 424. After this processing, a determination around successful enrollment is made at step 426; if the enrollment is deemed successful, the workflow proceeds to step 428, where it is checked whether the employer needs to approve the request.

If an approval is required, the enrollment request is forwarded to the employer at step 430. If the employer approves at step 438, a PIN on the given Mobile Number or Email Address is sent for verification at step 432. Once the employee authenticates their identity by entering the correct PIN at step 434, the data from employee answers, third party sources, and preloaded data (if present) are moved into employee database and credentials along a message of successful enrollment is sent to the user at step 436, after which the process terminates at step 412 upon successful enrollment. If the employer disapproves the request at step 438 or an incorrect PIN is entered at step 434, the employee is notified about the rejection at step 440, and given an option to retry at step 442.

If at step 426, the enrollment is deemed unsuccessful, the user or employee is notified about the rejection at step 440, and given an option to retry at step 442.

If the process is to be retried based on the user feedback and process settings, the workflow reverts to either step 404 for repeat of the workflow, or alternatively to step 408 or 406 (reversion to 406 or 408 is not shown in Figure). If no retry is offered or chosen, the workflow terminates at step 412.

In yet another embodiment, web based methods are used, wherein the website URLs being used point to different employers. In such an embodiment, an employee interested in enrolling submits a request at the appropriate website (for example: www.mymonow.com/CompanyA) or at a kiosk placed at the employer site. In one embodiment, a request is sent to the employer for verification, while in an alternative embodiment which is an automated version, the employee information (first name, last name, employee ID) is checked against the database already provided, and if the data is found to been matching, a PIN is sent to the mobile number of the employee which can be entered right there (using the web or a kiosk) within a specified time period, say 60 minutes, or 24 hours. On wrong input of the PIN, after a certain number for attempts (for example, 3 attempts) the PIN is considered to be expired and invalid for further enrollment requests. If the PIN was entered correctly then the user is considered enrolled.

Figure 5:
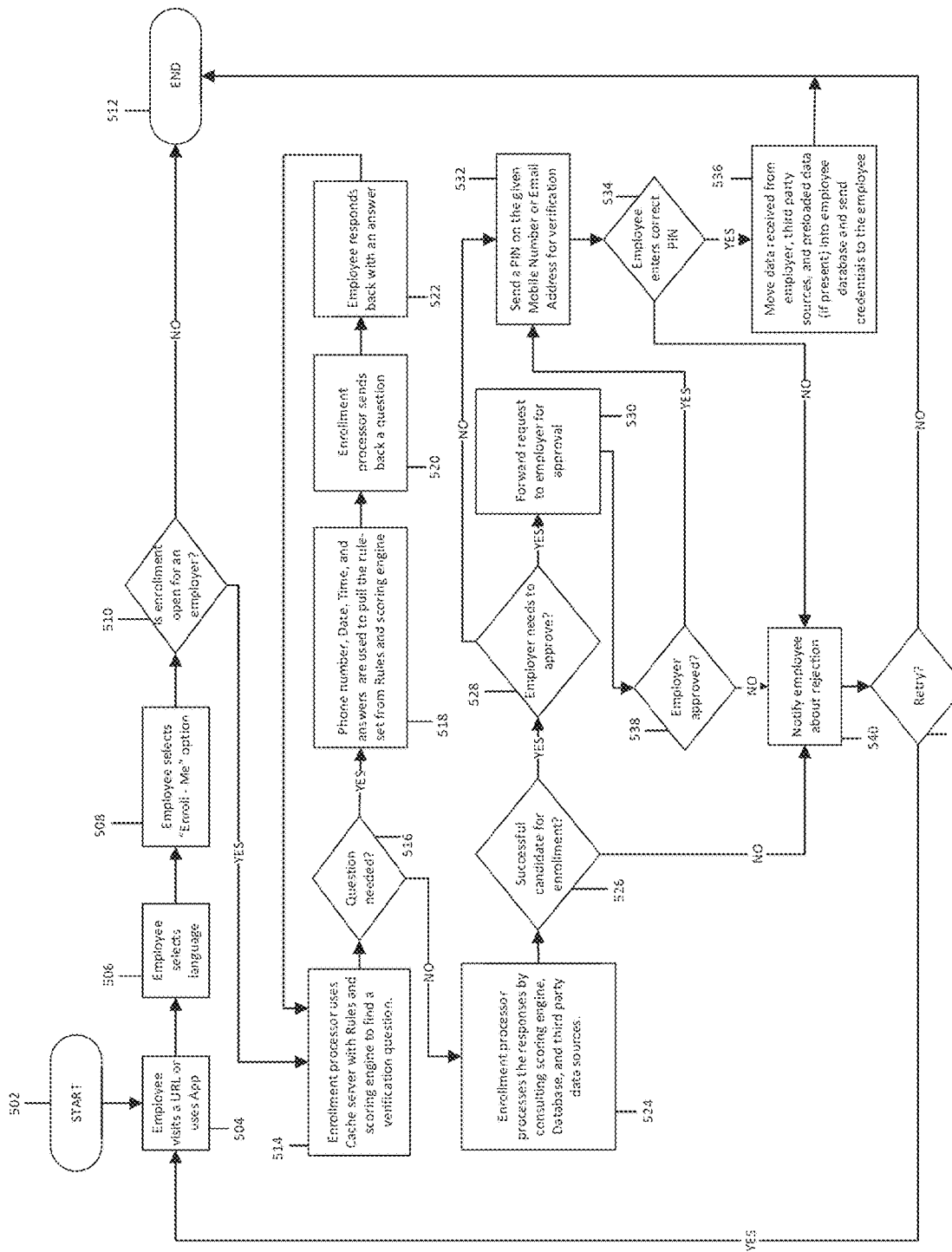
FIG. 5 is a flow diagram that illustrates the workflow of an example of enrollment via the web using a browser or an App in accordance with the present disclosure.

FIG. 5 is a flowchart illustrating the workflow for a web based enrollment. A user or employee uses either a Mobile Application ('App') or browser at step 504, proceeds to select a language at 506, and then selects a button or icon signifying enrollment such as an 'Enroll me' option at 508. The enrollment processor checks to see if enrollment is open for the given employer at step 510. If enrollment is not open, the process terminates at step 512, along with conveying a suitable message to that effect.

If enrollment is open, the enrollment processor uses its Cache along with a Rules engine and a scoring engine at step 514 to check if a verification question is required or whether enrollment can proceed without any additional verification. If it is determined that a further question or data is required at step 516, the workflow proceeds to step 518 where the already received data such as Phone number, Date, Time, and answers are used to pull the rule-set from the Rules and scoring engines, based on which the Enrollment processor displays a query or question back to the employee at step 520.

Once the employee responds with their answer(s) at step 522, the workflow reverts to step 514, where the Enrollment processor processes the newly received data in conjunction with the data already received and to step 516, where the determination about additional data is made. If it is determined at step 516 that no further verification is required, then the Enrollment processor next processes the responses using the scoring engine, Database, and third party data sources at step 524. After this processing, a determination around successful enrollment is made at step 526; if the enrollment is deemed successful, the workflow proceeds to step 528, where it is checked whether the employer needs to approve the request.

If an approval is required, the enrollment request is forwarded to the employer at step 530. If the employer approves at step 538, a PIN on the given Mobile Number or Email Address is sent for verification at step 532. Once the employee authenticates their identity by entering the correct PIN at step 534, the data from employee answers, third party sources, and preloaded data (if present) are moved into employee database and credentials along a message of successful enrollment is sent to the user at step 536, after which the process terminates at step 512 upon successful enrollment. If the employer disapproves the request at step 538 or an incorrect PIN is entered at step 534, the employee is notified about the rejection at step 540, and given an option to retry at step 542.

If at step 526, the enrollment is deemed unsuccessful, the user or employee is notified about the rejection at step 540, and given an option to retry at step 542.

If the process is to be retried based on the user feedback and process settings, the workflow reverts to either step 504 for repeat of the workflow, or alternatively to step 508 or 506 (reversion to 506 or 508 is not shown in Figure). If no retry is offered or chosen, the workflow terminates at step 512.

Card based enrollment is also envisaged in some embodiments where cards with unique numbers are handed out to employees that are interested in enrollment, which can then be used to enroll over the web through browsers, through a Mobile Application ('App'), or via a kiosk. A user interested in enrolling is given a card—this card has a unique identifier which could be a number, may consist of either all numerals or a combination of numerals and alphabets and with a specified maximum length. The card may carry numbers that are coded to automatically indicate employer, location and other information. A cards table database ("Enrollment-Cards") is separately prepared and stored where all assigned card numbers are stored.

Figure 6:
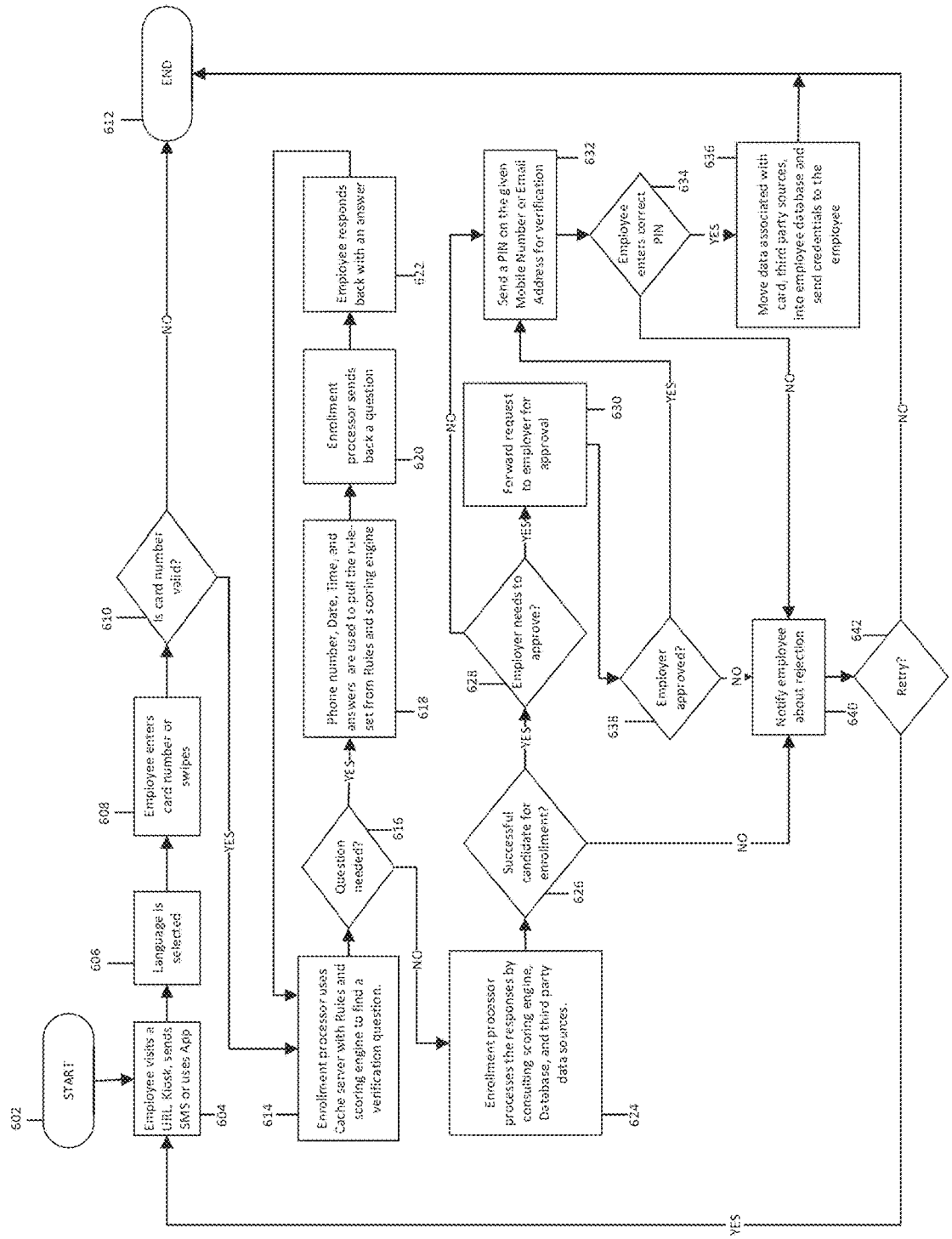
FIG. 6 is a flow diagram that illustrates the workflow of an example of enrollment using pre-issued cards in accordance with the present disclosure.

The flowchart in FIG. 6 illustrates enrollment in the system using a card. A user or employee uses either a Mobile Application software (App), browser or a self-service or assisted kiosk at step 604, proceeds to select a language at 606. A query is made as to whether enrollment Card on next screen (an image of the card may be displayed)—if the user answers in the negative, a non-card enrollment method is used, if the user answers in the positive, then on the next page or screenshot, a new screen is displayed. The user then either swipes the card at a card reader or enters the card number at a location signifying enrollment such as an 'Enroll me' option at 608. The new screen has Card Number field as the first field and later additional data such as First Name, Last Name, Date of Birth, and Mobile Number are requested to be entered.

The enrollment processor checks to see if enrollment is open for the given employer at step 610. If enrollment is not open, the process terminates at step 612, along with conveying a suitable message to that effect. If enrollment is open, the enrollment processor uses its Cache along with a Rules engine and a scoring engine at step 614 to check if a verification question is required or whether enrollment can proceed without any additional verification. If it is determined that a further question or data is required at step 616, the workflow proceeds to step 618 where the already received data such as Phone number, Date, Time, and answers are used to pull the rule-set from the Rules and scoring engines, based on which the Enrollment processor displays a query or question back to the employee at step 620. Once the employee responds with their answer(s) at step 622, the workflow reverts to step 614, where the Enrollment processor processes the newly received data in conjunction with the data already received and to step 616, where the determination about additional data is made.

If the requested fields match at the backend, the card number is verified as to whether it is good (a table having good card numbers is maintained). If it is determined at step 616 that no further verification is required, then the Enrollment processor next processes the responses using the scoring engine, Database, and third party data sources at step 624. After this processing, a determination around successful enrollment is made at step 626; if the enrollment is deemed successful, the workflow proceeds to step 628, where it is checked whether the employer needs to approve the request.

If an approval is required, the enrollment request is forwarded to the employer at step 630. If the employer approves at step 638, a PIN on the given Mobile Number or Email Address is sent for verification at step 632. Once the employee authenticates their identity by entering the correct PIN at step 634, the data from employee answers, third party sources, and preloaded data (if present) are moved into employee database and credentials along a message of successful enrollment is sent to the user at step 636, after which the process terminates at step 612 upon successful enrollment. On successful enrollment, the card number is copied into a "CARDS" table for that user who just got enrolled. In an "EnrollmentCards" table, that particular card number is either marked used or deleted as it exists in the "CARDS" table. If the employer disapproves the request at step 638 or an incorrect PIN is entered at step 634, the employee is notified about the rejection at step 640, and given an option to retry at step 642.

If at step 626, the enrollment is deemed unsuccessful, the user or employee is notified about the rejection at step 640, and given an option to retry at step 642.

If the process is to be retried based on the user feedback and process settings, the workflow reverts to either step 604 for repeat of the workflow, or alternatively to step 608 or 606 (reversion to 606 or 608 is not shown in the Figure). If no retry is offered or chosen, the workflow terminates at step 612.

Figure 7:
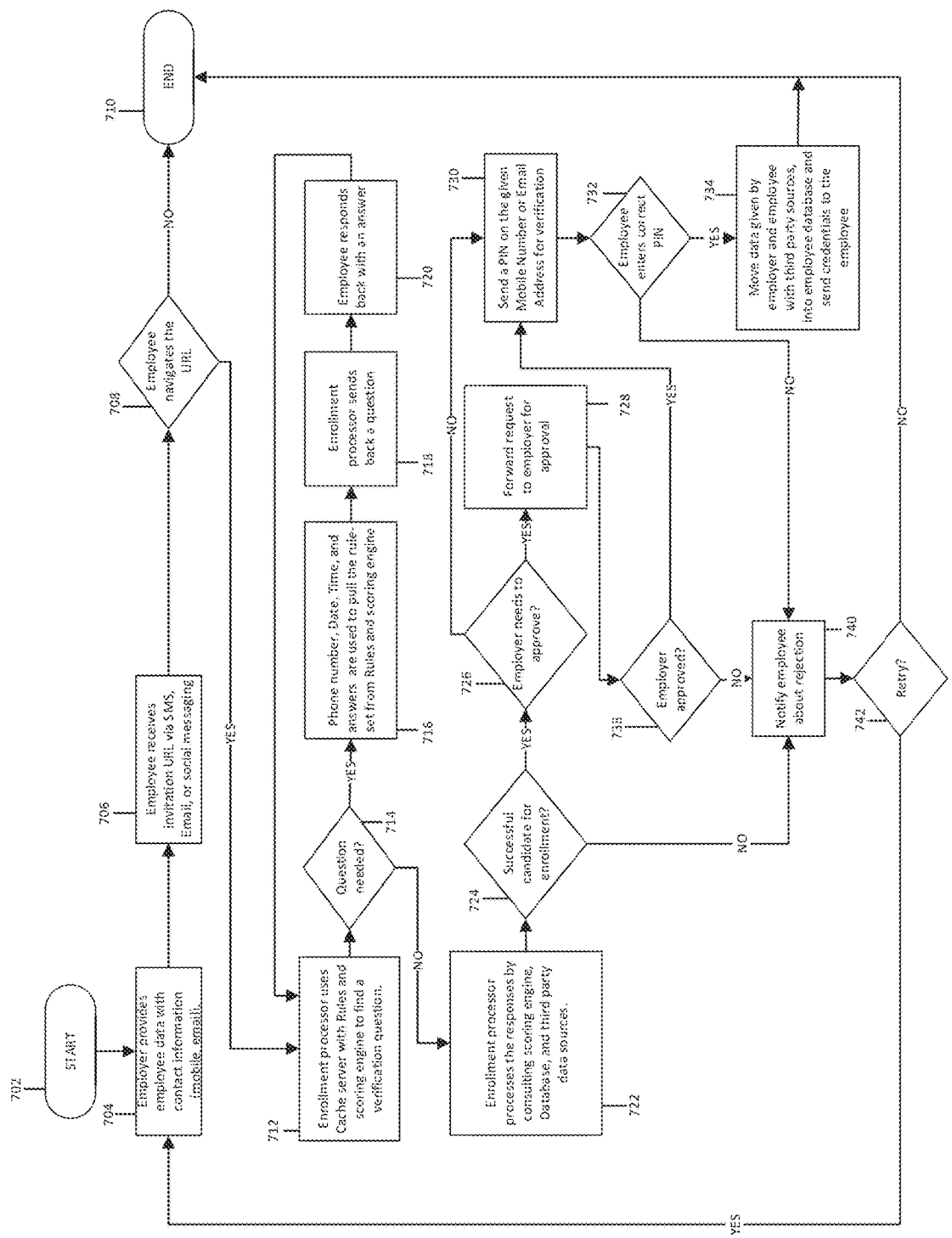
FIG. 7 is a flow diagram that illustrates the workflow of an example of bulk enrollment in accordance with the present disclosure.

FIG. 7 is a flowchart of another embodiment, which allows for bulk enrollment as well as enrollment for members whose data may be gathered from social networking data. An employer provides bulk data about employees or access to employee based social networks at step 704 or alternatively, the system is able to generate such data from private or public social networks.

Users selected by the system then receive invitations to enroll at 706, who may then go to the relevant URL or site at 708. If the user does not respond to the invitation, the process terminates at step 710. If the user responds to the invitation, the enrollment processor uses its Cache along with a Rules engine and a scoring engine at step 712 to check if a verification question is required or whether enrollment can proceed without any additional verification.

If it is determined that a further question or data is required at step 714, the workflow proceeds to step 716 where the already received data such as Phone number, Date, Time, and answers are used to pull the rule-set from the Rules and scoring engines, based on which the Enrollment processor displays a query or question back to the employee at step 718. Once the employee responds with their answer(s) at step 720, the workflow reverts to step 712, where the Enrollment processor processes the newly received data in conjunction with the data already received and to step 714, where the determination about additional data is made.

If it is determined at step 714 that no further verification is required, then the Enrollment processor next processes the responses using the scoring engine, Database, and third party data sources at step 722. After this processing, a determination around successful enrollment is made at step 724; if the enrollment is deemed successful, the workflow proceeds to step 726, where it is checked whether the employer needs to approve the request. If an approval is required, the enrollment request is forwarded to the employer at step 728. If the employer approves at step 738, a PIN on the given Mobile Number or Email Address is sent for verification at step 730.

Once the employee authenticates their identity by entering the correct PIN at step 732, the data from employee answers, third party sources, and preloaded data (if present) are moved into employee database and credentials along a message of successful enrollment is sent to the user at step 734, after which the process terminates at step 710 upon successful enrollment. If the employer disapproves the request at step 738 or an incorrect PIN is entered at step 732, the employee is notified about the rejection at step 740, and given an option to retry at step 742.

If at step 724, the enrollment is deemed unsuccessful, the user or employee is notified about the rejection at step 740, and given an option to retry at step 742. If the process is to be retried based on the user feedback and process settings, the workflow reverts to either step 704 for repeat of the workflow, or alternatively to step 708 or 706. If no retry is offered or chosen, the workflow terminates at step 710.

In another embodiment, a request for access to the system is deemed as an enrollment request and acted upon by the service provider. For example, an employee of an employer with whom there is already an agreement in place goes up to a kiosk, or via an App, accesses the system. Up to that time, there may not have been any communication between this employee and the system. During this access operation, a subset of verifiable information such as phone number, employee id, date of birth, first name, last name is collected. When a request for cash or other service is thus initiated, a check is made against the database and if after due verification, scores point to sufficient confidence in a match, this access of the system itself is treated as a deemed enrollment request. The requisite agreement terms are displayed, and upon the acceptance of the terms, the employee is considered enrolled, and the session continues to provide access to the suitable services from the system.

Figure 8:
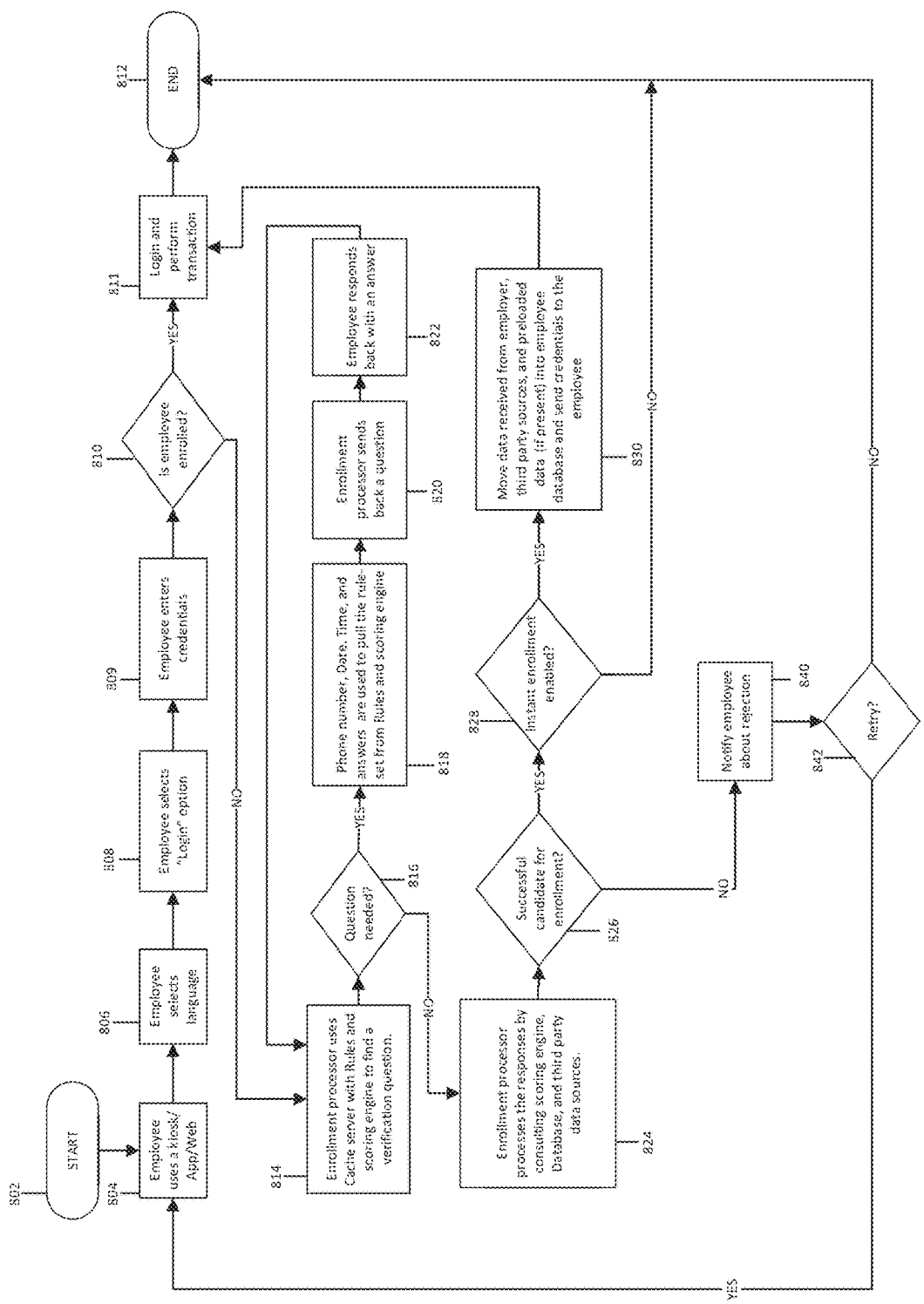
FIG. 8 is a flow diagram that illustrates the workflow of an example of indirect or access based enrollment in accordance with the present disclosure.

FIG. 8 illustrates the workflow of this embodiment in greater detail. The system for financial services, which may be accessed via a kiosk, App, browse or any other means is accessed at step 804. On selecting a language of use at step 806, the user selects the login screen or option at step 808, and enters credentials at step 809. Step 810 checks to see if the user is enrolled in the system; if the user is already enrolled, the workflow proceeds to step 811 to allow access to the system for performing the desired financial or other transaction.

If step 810 determines that the user is not enrolled, then the enrollment workflow is invoked and proceeds to step 814 to determine authentication and if a question is needed at step 816.

If it is determined that a further question or data is required at step 816, the workflow proceeds to step 818 where the already received data such as Phone number, Date, Time, and answers are used to pull the rule-set from the Rules and scoring engines, based on which the Enrollment processor displays a query or question back to the employee at step 820. Once the employee responds with their answer(s) at step 822, the workflow reverts to step 814, where the Enrollment processor processes the newly received data in conjunction with the data already received and to step 816, where the determination about additional data is made.

If it is determined at step 816 that no further verification is required, then the Enrollment processor next processes the responses using the scoring engine, Database, and third party data sources at step 824. After this processing, a determination around successful enrollment is made at step 826; if the enrollment is deemed successful, the workflow proceeds to step 828, where it is checked whether the employer needs to approve the request, and whether instant enrollment is allowed or enabled.

If instant enrollment is enabled, the data from employee answers, third party sources, and preloaded data (if present) are moved into employee database at step 830 as part of the enrollment, after which the process moves to step 811 to allow the user to complete the login and perform a transaction, and to the end of the workflow at step 812.

If at step 826, it is determined that the verification/authentication is incomplete, the employee is notified at step 840, and given an option to retry at step 842. If a retry option is chosen, the workflow then proceeds to step 804 to redo the process. If instant enrollment is not enabled at step 828, or a retry is not selected at step 842, the workflow proceeds to its end at step 812.

In many of the aforementioned embodiments, the enrollment processor matches the incoming data from the user or employee against the preloaded data in the database, and determines whether there is a unique match, in which case the enrollment is considered to be successful. Scoring systems may be used to determine the certainty of the match, and cases where the computed score does not cross a certain threshold may involve an additional step of the service provider calling either the employer or employee before terminating in a successful enrollment or a rejection.

Figure 9:
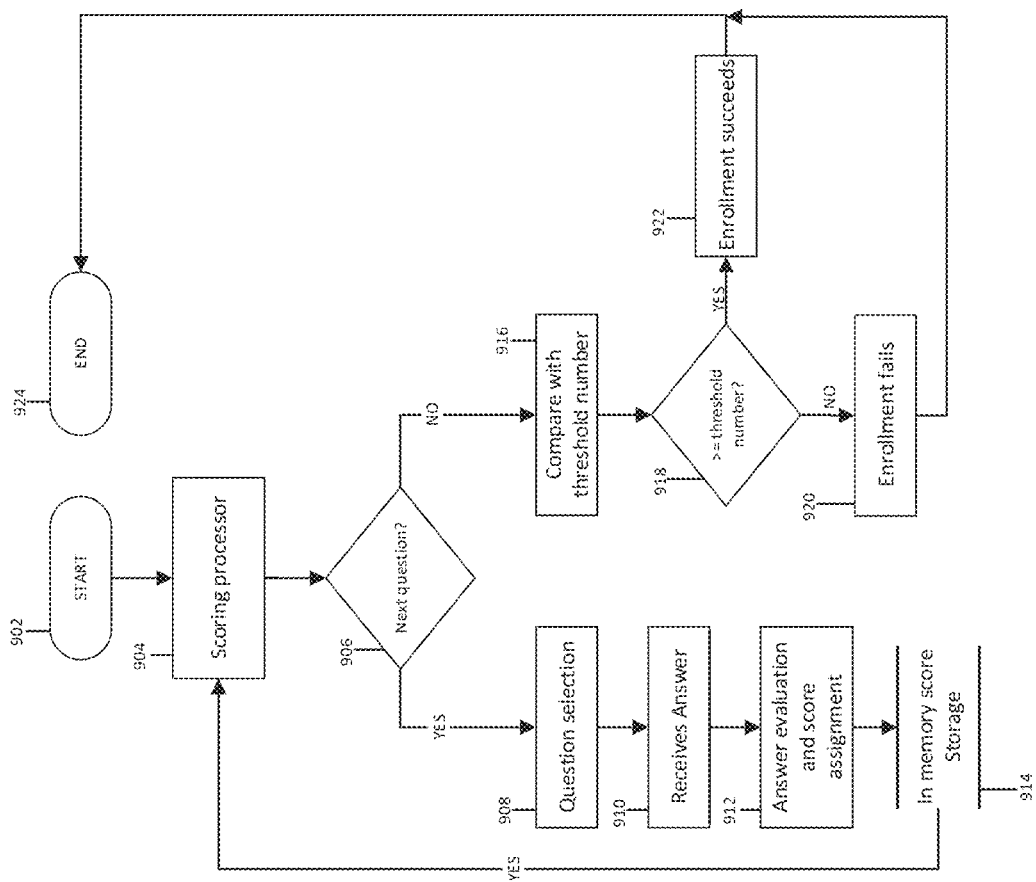
FIG. 9 is a flow diagram that illustrates an example scoring engine in accordance with the present disclosure.

FIG. 9 is a flowchart that illustrates an exemplary embodiment of such a scoring system. The scoring processor or engine 904 is configured to determine the certainty of a match when an enrollment request is received. When such a request is received, the scoring processor first determines if an additional question or information is needed at step 906. Once a determination is made at step 906 that additional information is needed, the question is generated at step 908.

Once a response is received at step 910 by means of direct data entry or other means by the user, the answer is evaluated and a score assigned at step 912. Fuzzy logic in the form of partial scores may also be used in assigning the score, which is stored in the in-memory score storage at step 914. The workflow then reverts to step 904 with a check as to whether additional data is needed.

If no additional data is needed because sufficient data was derived through the query process or in certain cases where enough information may already be available at the onset itself, the workflow proceeds to step 916, where the score is compared to a predetermined threshold. At step 918, based on the threshold comparison, if the computed score exceeds or is substantially equal to the threshold, the authentication and enrollment is deemed a success at step 922, and the scoring process proceeds to its end at step 924 for further processing.

If the computed score is below the threshold, the authentication and/or enrollment is considered to have failed at step 920, and the workflow of the scoring process proceeds to the end at step 924 for further processing.

Figure 10:
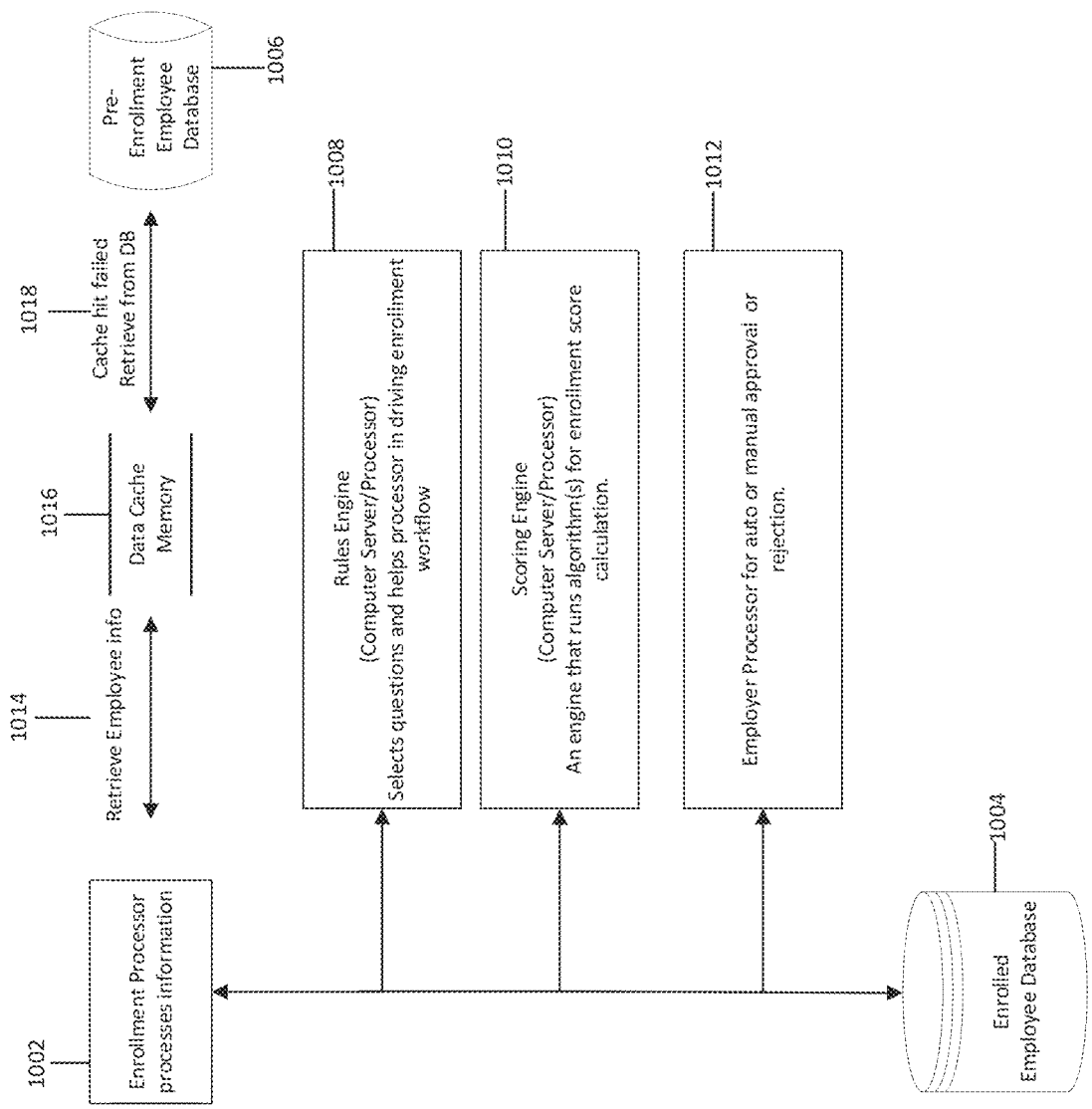
FIG. 10 is a block diagram that illustrates an example implementation architecture in accordance with the present disclosure.

FIG. 10 is a schematic of an exemplary architectural embodiment of the solution. An enrollment processor 1002 is communicatively coupled with a Rules engine 1008 which selects questions and helps the enrollment processor in driving enrollment workflow, a Scoring Engine 1010, which runs one or more algorithms for computing an enrollment score, and an Employer Processor 1012, which may process cases where employer approval is required. In embodiments where employer approval is implicit or not needed, the Employer Processor may not be deployed. Similarly, the Rules Engine and Scoring Engine may be configured to run as a single engine in some implementations.

In addition, the enrollment processor 1002 is communicatively coupled with a Data cache memory 1016, from which user and employee information may be retrieved quickly in step 1014. The architecture allows for the data cache memory 1016 to fetch/retrieve data in step 1018 from the Pre-enrollment data base 1006 when the cache hit fails. The Enrollment processor 1002 is also communicatively coupled with the enrolled employee database 1004, where the data from successfully enrolled users and employees may be stored.

Batch-wise addition of employer data is also possible in an embodiment, wherein the database is directly updated by the employer in question (Tier-2 additions) or by the service provider (Tier-3 additions). The authentication of the data in these cases is a deemed authentication.

Another embodiment is envisaged where a one click enrollment is implemented. In this embodiment, employee and employer data is preloaded into a database. When an incoming enrollment request is received, the data embedded in the request is compared to the grid of preloaded data, and if sufficient data fields match, the enrollment process is considered to be successful, and the message sent to the enrolling employee.

In another embodiment, the enrollment and onboarding system is configured in a manner where the expectation of enrollment is used as a trigger. When multiple data sets match, a call may be placed to the number to verify the identity of the enrolling employee. A time switch is included and based on a predetermined limit, incoming enrollment requests exceeding a certain number are throttled.

In another embodiment, users are added into the database directly. In this embodiment, it is assumed that already collected authenticated data is added by either the employer or the service provider directly into the database and credentials are sent to the users either via a mobile phone or through another means to enable subsequent access to the system.

Figure 11:
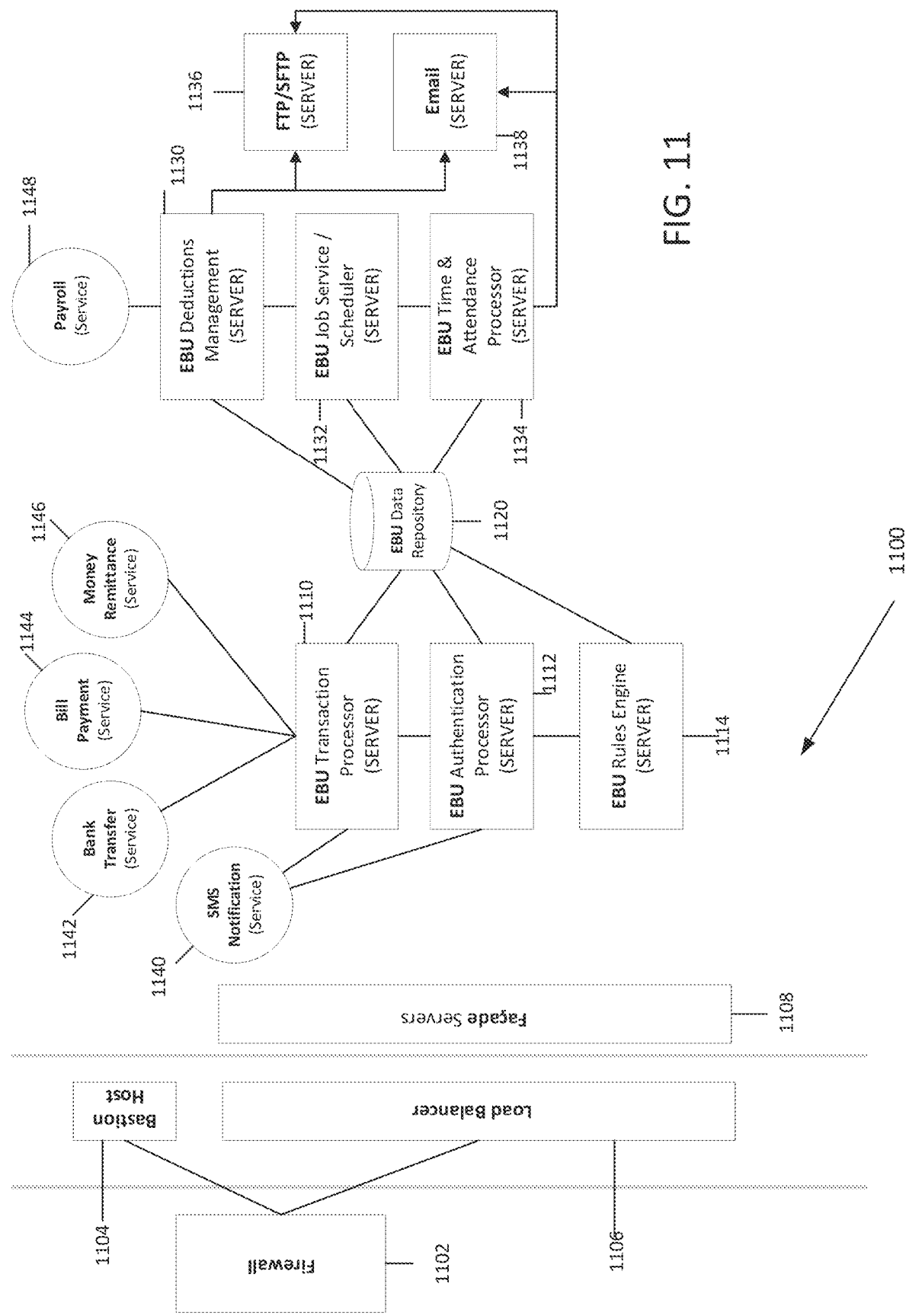
FIG. 11 is a schematic that depicts the architectural elements of a preferred embodiment of the invention.

FIG. 11 is a block diagram that depicts system architecture and interaction of various sub-components of a computer system 1100. A firewall 1102 stands at the outside interface of the system, which is communicatively coupled to a bastion host 1104 and a load balancer 1106 for distribution of the load that originates from the end points (i.e. Mobile app, desktops, self-service kiosks, and API). A set of façade servers 1108 serve the necessary interfaces to end points that are connecting to the system. A central EBU data repository 1120 is communicatively coupled to a series of servers assigned with different roles to perform tasks needed for EBU access. An EBU transaction processing system server 1110 is the core server accessed through façade servers for the transaction processing.

The EBU Transaction processing server (or Transaction Processor) 1110 serves as a transaction processor for performing processing that includes one or more of the following functions:

Employer Enrollment;
Employee Pre-Enrollment & Enrollment;
Transaction Authorization;
Kiosk Based Fulfillment (cash, billpay, remittances, check cashing, other);
Settlement, for example by way of any of Automatic Clearing House (ACH), prepaid card/debit card, eWallet, retail point-of-sale (POS), and/or other systems or mechanisms;
Repayment/Collection (payroll deductions or paid directly to the third party through cash, ACH, credit, debit, check, wire transfer, other);
Operation of the system so as to provide additional products and services such as cash access, Billpay, Remittance, Check Cashing, Savings, Loyalty, Prepaid LD (e.g., long distance) minutes & Cellular Top-Up, Credit Counseling, Credit Reporting, Budgets, Prepaid Cards, Secured & Unsecured Credit Cards, eWallets, Offers & Discounts for good & services and other financial services;

Peer to Peer lending platform for user members; and/or

Multilingual Customer Service supporting all of the above functions.

An EBU Authentication Server 1112 is also accessed through façade servers to be able to access the transaction processing access, and an EBU Rules Engine server 1114 brings logic that defines user access to the features and the nature of the access—all these three servers work in collaboration. The central EBU data repository 1120 is also communicatively coupled to a EBU Deductions Management Server 1130 which performs the deduction management including deduction creation, cascading, deletion, processing, exporting, and clearance; an EBU Job Service Scheduler server 1132 takes different tasks to schedule and eventually execute to make the system automated, and the EBU Time and Attendance server 1134 is responsible for importing, parsing, processing, and calculation of data about the hours worked by an employee. The FTP/SFTP server 1136 and an Email server 1138 also run in conjunction with these servers. In addition to the servers listed, are services that run attached to the servers such as a Payroll service 1148, an SMS Notification service 1140, a bank transfer service 1142, a Bill Payment service 1144, and a Money remittance service 1146.

It should be appreciated that any of the referenced servers can take different forms, including being combined in their functioning. Additionally, it should be appreciated that the servers depending upon the embodiment can take any of a variety of system forms that perform the execution of software code, perform processing or tasks, operate in accordance with instructions, or otherwise serve a processing purpose. For example, in at least some embodiments, the core server can take the form of a microprocessor, the form of one or more other processing devices such as programmable logic devices, or can take the form of multiple processing devices interacting with one another. In general, the present disclosure is intended to encompass a variety of embodiments of processing systems and devices including processing systems and devices employing hardware, software, firmware, middleware, microcode, hardware description languages, or any combination thereof.

Also, the central EBU data repository 1120 depending upon the embodiment can take any of a variety of forms including, for example, a distributed database, and also can take the form of multiple memory devices interacting with one another. Indeed, the memory can encompass any one or more devices for storing, containing, or carrying information, instructions, or data, including read-only memory (ROM), random access memory (RAM), magnetic RAM, core memory, magnetic disk storage media, optical storage media, flash memory devices, or other computer-readable media (e.g., portable or fixed storage devices, optical storage devices, wireless channels, a SIM card, other smart cards, and various other media) capable of storing, containing, or carrying information, instructions, or data. When implemented in software, firmware, middleware, or microcode, program code or code segments employed to perform the processing or tasks can be stored in such memory or computer-readable media.

In some embodiments the computer system 1100 and particularly the servers and database thereof may be owned and operated by the third party (e.g., a computer server owned and operated by the third party), and in other embodiments they are provided by the third party by utilizing still another party's processing and/or memory resources in a manner partly, substantially, or entirely controlled by the third party, for example, by utilizing cloud computer services, particularly cloud computer services that provide a secure storage mechanism for data (e.g., so that the data is exclusively accessible by the third party/third party computer system(s)) as well provide processing services.

Figure 12A:
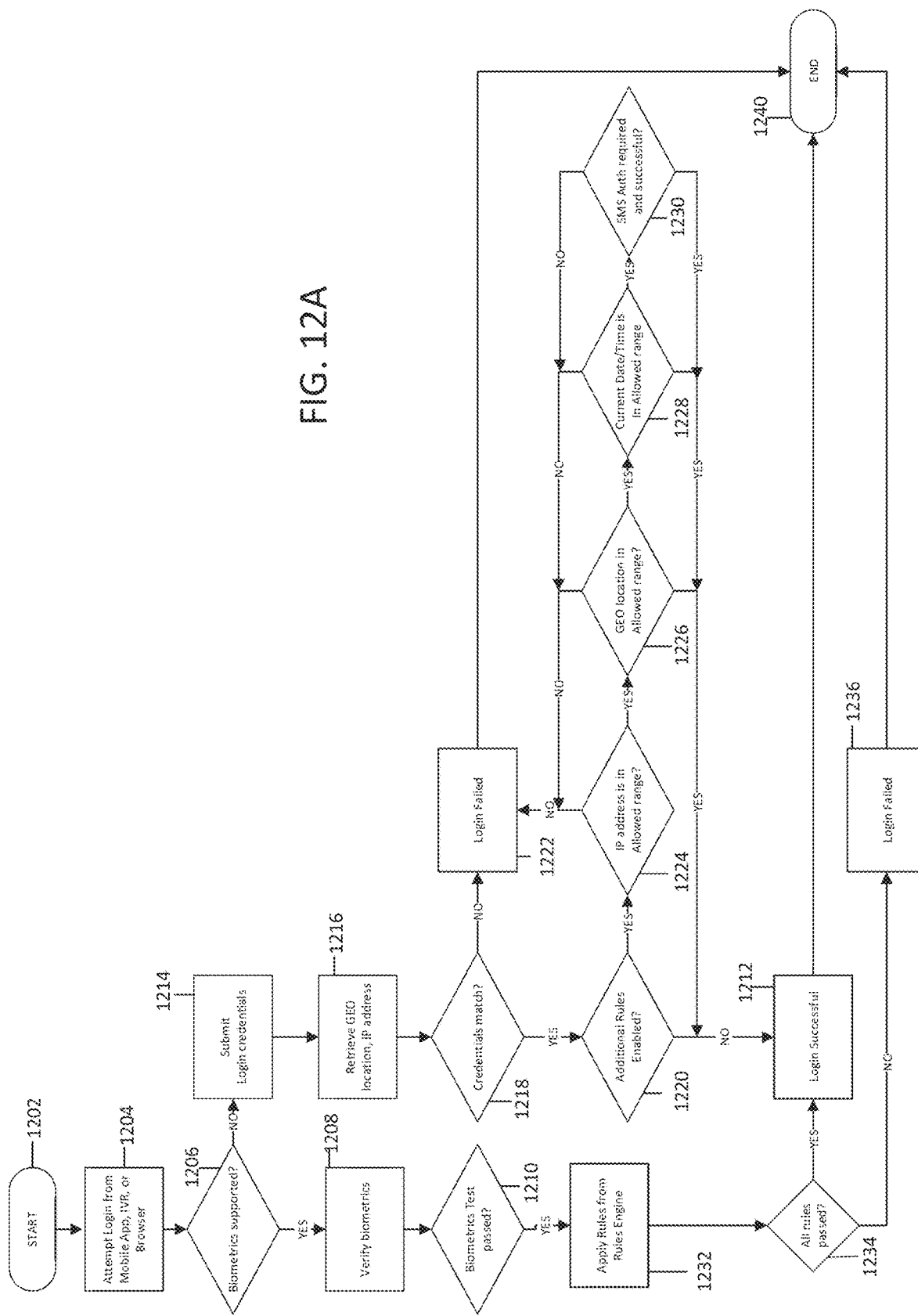
FIG. 12A is a flowchart that illustrates further details of an example login and authentication process.
Figure 12B:
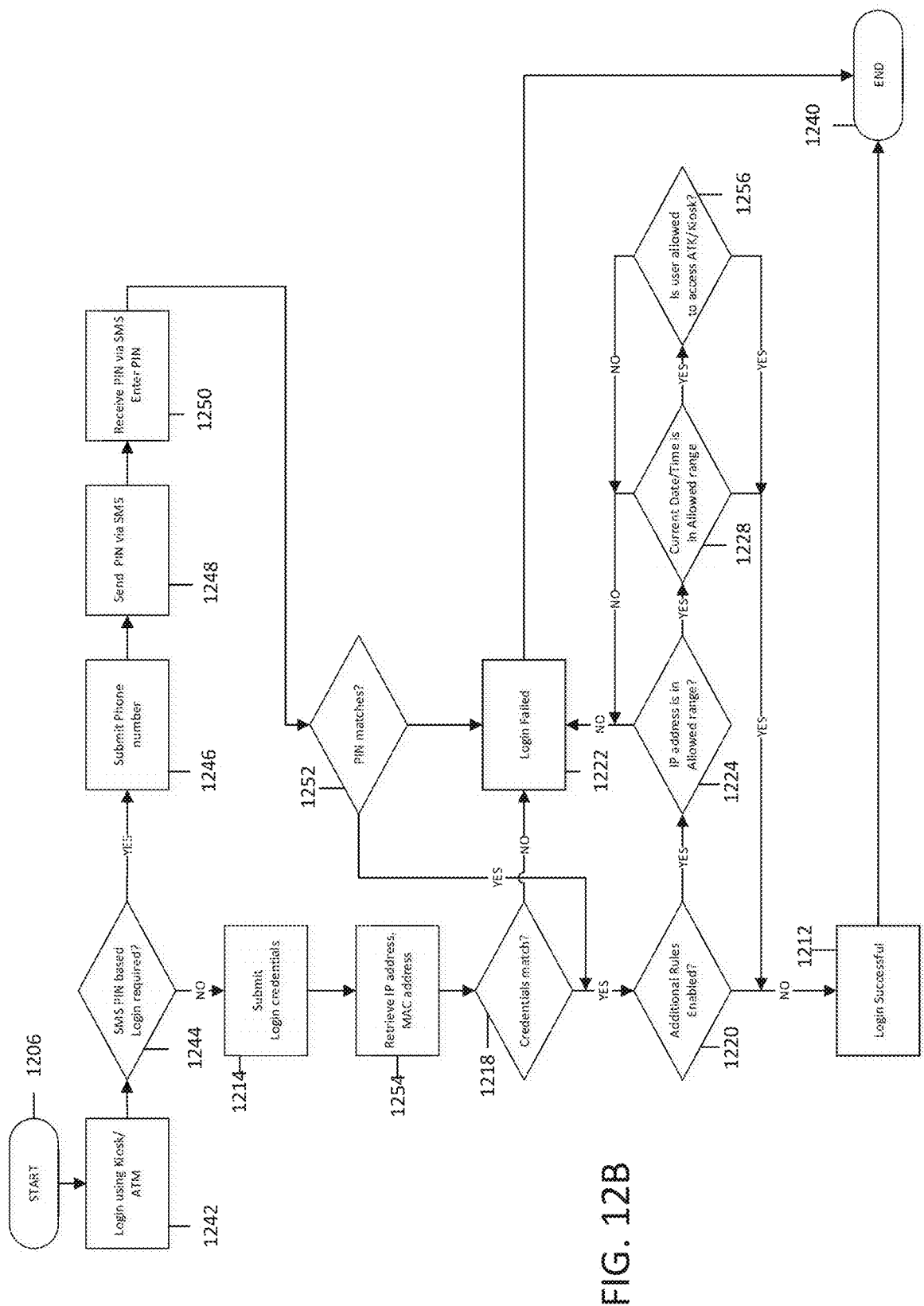
FIG. 12B is a flowchart that illustrates further details of the login and authentication process in a different embodiment.

FIGS. 12A and 12B provide additional details about the login sequences for different types of login devices. The login sequences may be utilized by user devices for enrolment and utilization of payroll services.

FIG. 12A is a flowchart that describes an exemplary login sequence for a login attempt from a Mobile App, or Web Browser, or any other type of personal device. Referring now to FIG. 12A, after the workflow commences at step 1202, a login attempt from a Mobile App is detected at step 1204. A first check whether biometric login is supported for that user is performed at step 1206 in which case, a biometric login sequence is initiated, and the biometrics are verified at step 1208, and if the biometric test passes at step 1210, rules from a rules engine are applied to check for the eligibility of the user to transact at step 1232. At step 1234, if the rules engine check has passed, then, the login is considered successful at step 1212, and the subprocess workflow terminates at step 1240. If, however, one or more rules applied by a rules engine fails for the case, then the biometric login is considered to have failed at step 1236, and the subprocess workflow terminates at step 1240.

For use cases where biometric login is not enabled, a login screen is displayed, and the user credentials are requested and obtained from the user at step 1214.

User credentials may be a login name assigned at the time of initial enrollment, a registered phone number of the user, an email address or an Employee ID of the user. Along with the user credentials, device information such as the geolocation information of the mobile device and its Internet Protocol (IP) address are also retrieved at step 1216.

The employee user enters login (e.g., username and password) information and the central system (an authentication processor server) receives that information. Subsequently, the third party computer system determines whether the employee (user) is properly authenticated, that is, whether the login information is recognized and acceptable as an indication of an employee who was enrolled in the system. If so, the process advances to step 1220. Alternatively, if not, the third party computer system can interact with the user in any of a number of manners by which an attempt is made to correct the login/authentication problem—e.g., by recommencing the process ("retry") or engaging in communications with the employer computer system in a manner allowing for the possibility that the employee has forgotten his or her login information ("forgot username/password"). After the operation(s) associated with a retry attempt are completed (e.g., after the employee has been provided with his or her username or password information that had previously been forgotten), the process returns to the step 1214.

If the provided user credentials do not match at step 1218, the login is considered to have failed, and the workflow can either terminate at step 1240, or alternately (not shown), the user may be prompted to re-enter their credentials. If the provided user credentials do match at step 1218, the system checks if additional security rules have been enabled at step 1220. These additional rules may be customized to certain employers, certain categories of employees at certain employers, or may be applied across the board to all users, depending on how the system is configured. In an exemplary embodiment, a check may be made at step 1224 as to whether the IP address received matches an allowed range of IP addresses. For example, IP addresses from certain regions may be excluded, while IP addresses from where successful logins have occurred over a certain time-frame may be allowed. If the IP address received falls outside the allowed range the login is deemed to have failed at step 1222, and the workflow terminates at step 1240. Details of the failed login attempt are stored in a database for subsequent analysis.

If the IP address falls within the allowed range at step 1224, the geolocation received from the mobile device at step 1216 is compared against an allowed range (geofence) for the geolocation at step 1226. The geofence may be a combination of system and user defined parameters and may also be defined using a combination of past historical access locations and permitted locations based on the workplace and residential address of the employee. Aspects of this invention may allow for an employee user to define the geofence and also make adjustments to the geofence based on expected travel plans. If the received geolocation falls outside the range, then the login is deemed to have failed at step 1222, and the workflow terminates at step 240 and the details of the failed login attempt are stored in a database for subsequent analysis. If the received geolocation falls inside the allowed range, then a check is made at step 1228 whether the rules permit an access to the EBU system at the current time and date. If the rules permit an access, then a check is made at step 1230 as to whether an SMS based authorization is additionally required, in which case, it is carried out. If step 1230 also is successful, then the login is deemed to be successful at step 1212.

FIG. 12B is a flowchart that illustrates the login sequence used when an access is attempted from a kiosk or ATM. This sequence may also be used to cover access login processes for use cases when POS terminals or other enterprises act as cash access points, particularly where a multi-factor login sequence may be desirable. This sequence may also be initiated for a device where an assessed security level of the device warrants it.

When an access attempt is made at step 1242, the system checks whether an SMS/PIN based login is to be used at step 1244, in which case, the user is queried to enter their registered telephone number at step 1246. The system, after confirming in its database the existence of that registered phone number then sends a code or PIN to the phone number at step 1248, and requests the entry of the PIN by the user at step 1250. If the telephone number is determined to not be registered, then the third party computer system interacts with the kiosk in a manner causing the kiosk to show an error message to the employee, and/or causing the kiosk to offer suggestions to the employee (e.g., offering a manner of contacting a helpdesk service provided by the third party).

If the PIN entered matches that which was sent to the registered phone number at step 1252, the system goes on to check if additional rules are enabled at step 1220. If additional rules are enabled, the workflow follows a pattern similar to that for an access from a Mobile App. Additionally, a check for whether the specific user is also authorized to use the kiosk or ATM is made at step 1256. If all the applied rules check pass, then the login is considered to be successful at step 1212.

Figure 13:
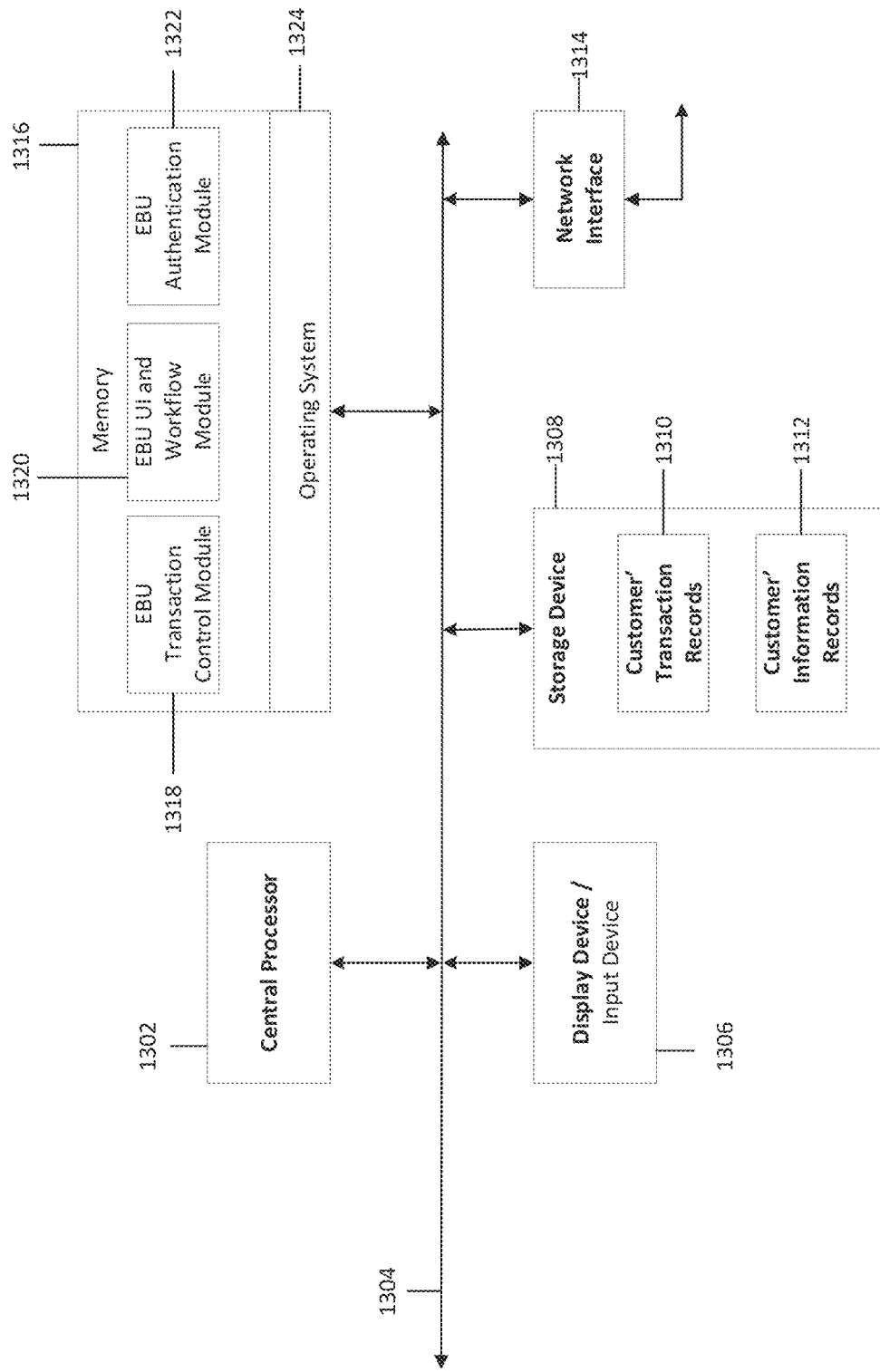
FIG. 13 is a block diagram depicting the different components of a device built in accordance with a preferred embodiment of the invention.

The integration of a device, e.g. a point of sale terminal (POS) with the EBU system is illustrated in FIG. 13. A central processor 1302 is communicatively coupled via a central multi-thread bus 1304 to various modules such as a Display or Input device 1306, a processor 1324 which represents the software layer that resides in the memory unit 1306 and comprises a EBU Transaction control module 1318, an EBU user interface (UI) and workflow module 1320 and an EBU authentication module 1322. Connected to the bus are also a Storage device 1308 which is comprised of customer transaction records 1310 and customer information records 1312 and a network interface 1314, which provides a communication link between the POS terminal and the EBU. The bus is capable of functioning over multiple network protocols.

The Display Device/Input Device 1306 can take any of a variety of forms including, for example, a keyboard, a monitor, a mouse or pointing device, and/or a touch screen and also can take the form of multiple user interface devices interacting with one another and/or the other components of the computer system. Also in at least some embodiments, the user interface of the Display Device/Input Device 1306 can include one or more sensors including, for example, image or light sensors (e.g., camera devices), position sensors, orientation sensors, accelerometers, etc. Also, the Network Interface 1314 is intended to be representative of any of a variety of input and/or output terminals that allow for communication between the terminal and other systems or devices. The one or more input and/or output terminals encompassed by the input/output port 1314 further is or are configured to allows for such communications to occur by way of any of a variety of communications media including, for example, wired or wireless communication links and any of a variety of networks or other communication. In this regard, it should particularly be appreciated that the communication network used in at least some embodiments include the internet.

Therefore, although the present disclosure describes particular embodiments of systems and methods, it should be understood that the present disclosure is not intended to be limited to the specific concepts or features described above. Rather, the methods, systems, and devices discussed above are intended merely to be examples. Further, it should be appreciated that the various embodiments encompassed herein can omit, substitute, or add various procedures or components as appropriate relative to the particular embodiments described above. For example, it should be appreciated that the methods described above (e.g., in the flow charts of FIGS. 1 through 13) instead in alternate embodiments can be performed in orders different from those described above, and/or that various steps can be added, omitted, or combined. Indeed, the steps or operations described herein can be performed in the sequences given above or in different orders (with the orders of the steps rearranged) as applicable. Further, although some of the processes described above involve operations performed as a sequential process, in other embodiments many of the operations can be performed in parallel or concurrently. Also, a number of steps can be undertaken before, during, or after the above-described process steps are performed. The processes (including subprocesses) and process steps (or substeps) encompassed by the present disclosure can be implemented in any of a variety of manners, can be automated in any of a variety of computers or other machines, and can be coded in software, firmware, or hard coded as machine-readable instructions and/or run through one or more processors that can implement the instructions.

Also, features described herein with respect to certain embodiments can be combined in various other embodiments, and different aspects and elements of the embodiments can be combined in a similar manner. Indeed, various features and aspects of the above-described concepts can be used individually or jointly. Additionally, although certain specific details are given in the description to provide a thorough understanding of the embodiments, it should be understood that the present disclosure also encompasses embodiments that can be practiced without these specific details. The specification and drawings are, accordingly, to be regarded as illustrative rather than restrictive. Further, it should be appreciated that the described systems, components, and devices can merely be components of still larger systems, where other rules can take precedence over or otherwise modify the operations or manners of application described above. Further, it should be appreciated that the concepts encompassed by the present disclosure can be utilized in any number of environments and applications beyond those described herein without departing from the broader spirit and scope of the specification. Additionally, it should be emphasized that technology evolves and, thus, many of the elements are examples and should not be interpreted to limit the scope of the invention. Therefore, having described several embodiments, it will be recognized by those of skill in the art that various modifications, alternative constructions, and equivalents may be used without departing from the spirit of the invention. It is specifically intended that the present invention not be limited to the embodiments and illustrations contained herein, but include modified forms of those embodiments including portions of the embodiments and combinations of elements of different embodiments as come within the scope of the following claim.

What is claimed is:

1. A computer-implemented method to provide access to tiered data comprising:
   providing an enrollment processor, wherein the enrollment processor is connected to a network via a firewall, and wherein the enrollment processor is communicatively coupled to a bastion host and a load balancer;
   generating, at the enrollment processor, an encryption key specific to a computing device associated with the tiered data;
   providing the encryption key to the computing device;
   receiving, at the enrollment processor, the tiered data that includes at least first tier data and second tier data, wherein the first tier data comprises encrypted data that has been encrypted using the provided encryption key and the second tier data comprises unencrypted data;
   storing the tiered data, wherein the first tier data is stored at a first database connected to the enrollment processor, and the second tier data is stored in an in-memory cache connected to the enrollment processor;
   receiving, at the enrollment processor, an access request from a second computing device associated with a user, wherein the access request includes data elements from the second tier data, and wherein the data elements are associated with the user;
   determining, using the in-memory cache, whether there is a match between the data elements and the stored second tier data;
   based on determination that there is the match, performing a decryption of a portion of the first tier data using the encryption key; and
   storing the decrypted portion of the first tier data in a third database connected to the enrollment processor.

2. The computer-implemented method of claim 1, further comprising based on a determination that there is no match between the data elements and the stored second tier data, retrieving additional data elements from the first database.

3. The computer-implemented method of claim 1, wherein receiving the tiered data comprises receiving the tiered data via one of: a web interface and a file exchange.

4. The computer-implemented method of claim 1, wherein receiving the tiered data comprises receiving the tiered data as a batch-wise addition to the first database.

5. The computer-implemented method of claim 1, wherein determining whether there is a match between the data elements and the stored second tier data comprises performing a cache hit of the in-memory cache.

6. The computer-implemented method of claim 1, further comprising preloading the first tier data and the second tier data into a grid, and wherein determining whether there is the match comprises determining whether a threshold number of data elements in the access request match data elements in the first tier data and the second tier data.

7. The computer-implemented method of claim 1, wherein receiving the access request from a second computing device associated with a user comprises receiving the access request via a short messaging service (SMS) message and wherein the method further comprises parsing the access request to determine a language of the access request.

8. A system, comprising:
   a user device configured to transmit an access request; and
   an enrollment processor, coupled to a data cache memory and to a first database, an in-memory cache, and a third database, wherein the enrollment processor is connected to a network via a firewall, and wherein the enrollment processor is communicatively coupled to a bastion host and a load balancer, and wherein the enrollment processor is configured to:
      generating an encryption key specific to a computing device associated with tiered data;
      providing the encryption key to the computing device;
      receiving the tiered data that includes at least first tier data and second tier data, wherein the first tier data comprises encrypted data that has been encrypted using the provided encryption key and the second tier data comprises unencrypted data;
      storing the tiered data, wherein the first tier data is stored at a first database connected to the enrollment processor, and the second tier data is stored in an in-memory cache connected to the enrollment processor;
      receiving an access request from a second computing device associated with a user, wherein the access request includes data elements from the second tier data, and wherein the data elements are associated with the user;
      determining, using the in-memory cache, whether there is a match between the data elements and the stored second tier data;
      based on determination that there is the match, performing a decryption of a portion of the first tier data using the encryption key; and
      storing the decrypted portion of the first tier data in a third database connected to the enrollment processor.

9. The system of claim 8, wherein the enrollment processor is further configured to based on a determination that there is no match between the data elements and the stored second tier data, retrieving additional data elements from the first database.

10. The system of claim 8, wherein receiving the tiered data comprises receiving the tiered data via one of: a web interface and a file exchange.

11. The system of claim 8, wherein receiving the tiered data comprises receiving the tiered data as a batch-wise addition to the first database.

12. The system of claim 8, wherein determining whether there is a match between the data elements and the stored second tier data comprises performing a cache hit of the in-memory cache.

13. The system of claim 8, wherein the enrollment processor is further configured to preloading the first tier data and the second tier data into a grid, and wherein determining whether there is the match comprises determining whether a threshold number of data elements in the access request match data elements in the first tier data and the second tier data.

14. The system of claim 8, wherein receiving the access request from a second computing device associated with a user comprises receiving the access request via a short messaging service (SMS) message and wherein the enrollment processor is further configured to parsing the access request to determine a language of the access request.

15. A non-transitory computer-readable medium comprising instructions that, responsive to execution by a processing device, cause the processing device to perform operations comprising:
 providing an enrollment processor, wherein the enrollment processor is connected to a network via a firewall, and wherein the enrollment processor is communicatively coupled to a bastion host and a load balancer;
 generating, at the enrollment processor, an encryption key specific to a computing device associated with tiered data;
 providing the encryption key to the computing device;
 receiving, at the enrollment processor, the tiered data that includes at least first tier data and second tier data, wherein the first tier data comprises encrypted data that has been encrypted using the provided encryption key and the second tier data comprises unencrypted data;
 storing the tiered data, wherein the first tier data is stored at a first database connected to the enrollment processor, and the second tier data is stored in an in-memory cache connected to the enrollment processor;
 receiving, at the enrollment processor, an access request from a second computing device associated with a user, wherein the access request includes data elements from the second tier data, and wherein the data elements are associated with the user;
 determining, using the in-memory cache, whether there is a match between the data elements and the stored second tier data;
 based on determination that there is the match, performing a decryption of a portion of the first tier data using the encryption key; and
 storing the decrypted portion of the first tier data in a third database connected to the enrollment processor.

16. The non-transitory computer-readable medium of claim 15, wherein the operations further comprise based on a determination that there is no match between the data elements and the stored second tier data, retrieving additional data elements from the first database.

17. The non-transitory computer-readable medium of claim 15, wherein receiving the tiered data comprises receiving the tiered data via one of: a web interface and a file exchange.

18. The non-transitory computer-readable medium of claim 15, wherein receiving the tiered data comprises receiving the tiered data as a batch-wise addition to the first database.

19. The non-transitory computer-readable medium of claim 15, wherein determining whether there is a match between the data elements and the stored second tier data comprises performing a cache hit of the in-memory cache.

20. The non-transitory computer-readable medium of claim 15, wherein receiving the access request from a second computing device associated with a user comprises receiving the access request via a short messaging service (SMS) message and wherein the operations further comprise parsing the access request to determine a language of the access request.

* * * * *